United States Patent
Nakanowatari

(10) Patent No.: US 7,690,457 B2
(45) Date of Patent: Apr. 6, 2010

(54) HYBRID VEHICLE CONTROL APPARATUS

(75) Inventor: Jun Nakanowatari, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 193 days.

(21) Appl. No.: 11/780,644

(22) Filed: Jul. 20, 2007

(65) Prior Publication Data

US 2008/0017427 A1 Jan. 24, 2008

(30) Foreign Application Priority Data

Jul. 21, 2006 (JP) .............................. 2006-198942
Jun. 6, 2007 (JP) .............................. 2007-149864

(51) Int. Cl.
*B60W 10/00* (2006.01)

(52) U.S. Cl. .............................. 180/65.265; 180/65.21; 903/914

(58) Field of Classification Search ................ 180/65.2, 180/65.3, 65.6, 65.8, 65.51, 65.21, 65.31, 180/65.275, 65.285, 65.265; 903/903, 906, 903/910, 918, 923, 914, 911, 945; 701/22, 701/83

See application file for complete search history.

(56) References Cited

U.S. PATENT DOCUMENTS

| | | | | |
|---|---|---|---|---|
| 4,793,980 A * | 12/1988 | Torobin | .................... | 423/213.5 |
| 5,895,333 A * | 4/1999 | Morisawa et al. | ........... | 903/903 |
| 6,359,345 B1 * | 3/2002 | Suzuki | ........................ | 903/903 |
| 6,615,940 B2 * | 9/2003 | Morisawa | ................... | 180/65.1 |
| 6,655,485 B1 * | 12/2003 | Ito et al. | ...................... | 180/65.6 |
| 6,736,753 B2 * | 5/2004 | Endo et al. | ................... | 903/903 |
| 6,837,816 B2 * | 1/2005 | Tsai et al. | ................ | 180/65.25 |
| 6,932,738 B2 * | 8/2005 | Aoki et al. | ....................... | 477/5 |
| 6,994,177 B2 * | 2/2006 | Ito et al. | ................... | 180/65.21 |
| 2002/0173391 A1 * | 11/2002 | Endo et al. | .................... | 474/18 |
| 2005/0155803 A1 | 7/2005 | Schiele | | |

FOREIGN PATENT DOCUMENTS

JP H11-082260 A 3/1999
JP 2000-255285 A 9/2000

* cited by examiner

*Primary Examiner*—Hau V Phan
(74) *Attorney, Agent, or Firm*—Global IP Counselors, LLP

(57) ABSTRACT

A hybrid vehicle control apparatus includes an engine, a motor, first and second engaging elements, an input rotational speed and a controller. The first engaging element is arranged between the engine and the motor to selectively connect and disconnect the engine and the motor. The second engaging element is arranged between the motor and a drive wheel to selectively connect and disconnect the motor and the drive wheel. The input rotational speed detecting section is configured to detect an input rotational speed of the second engaging element corresponding to a rotational speed of the motor. The controller is configured to determine whether the second engaging element is seized based on the input rotational speed when a disengagement command or a slip engagement command has been issued to the second engaging element and a drive force of at least one of the engine and the motor has been changed.

10 Claims, 10 Drawing Sheets

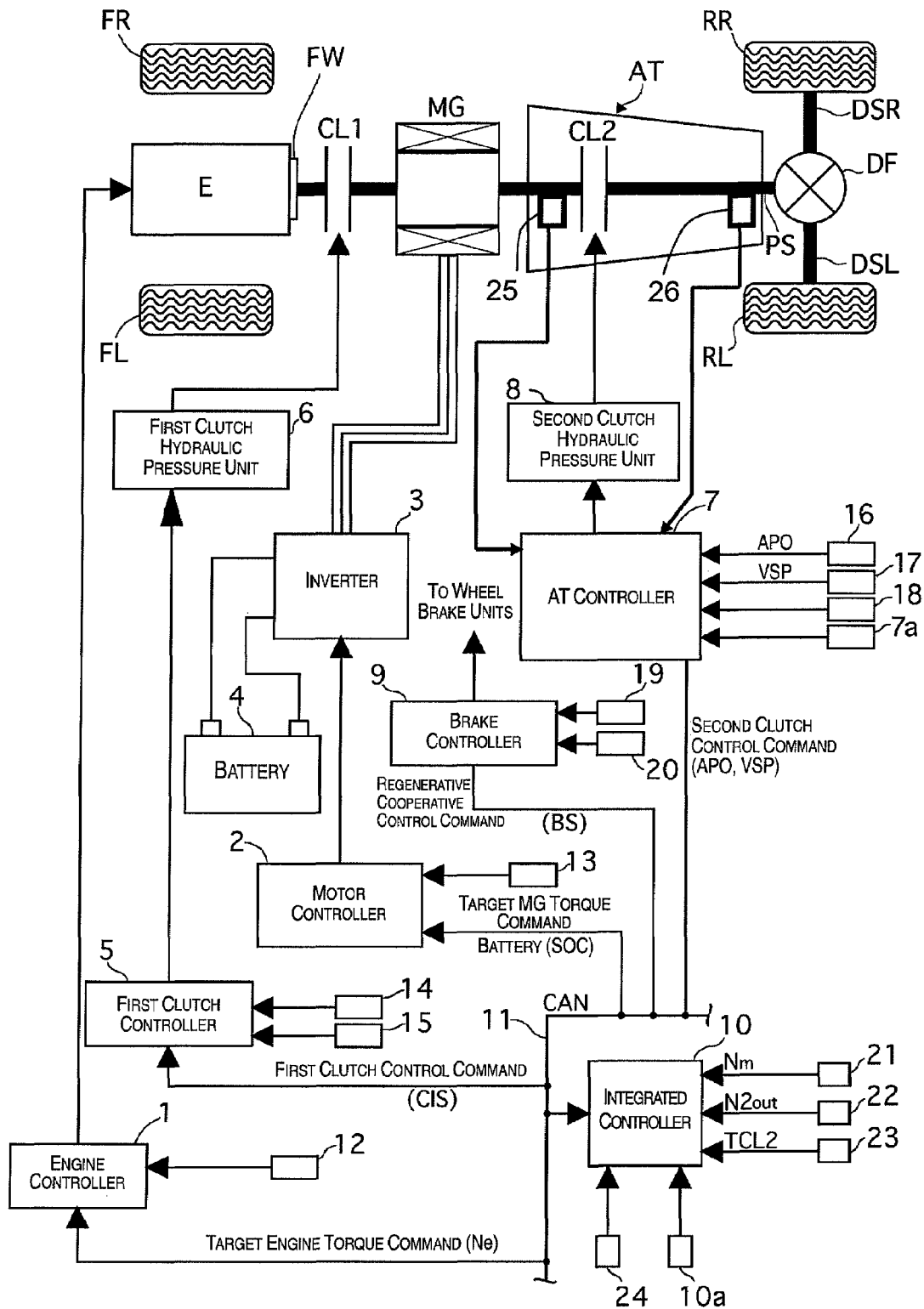
F I G. 1

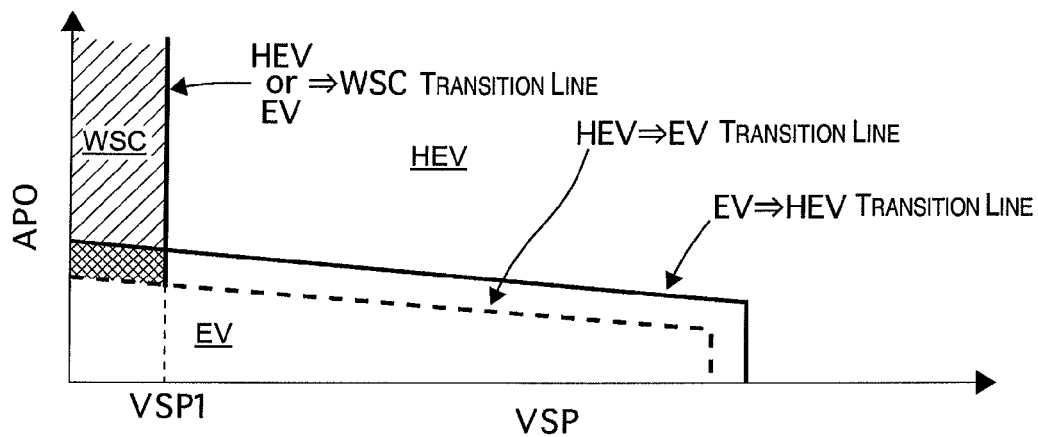
F I G. 4
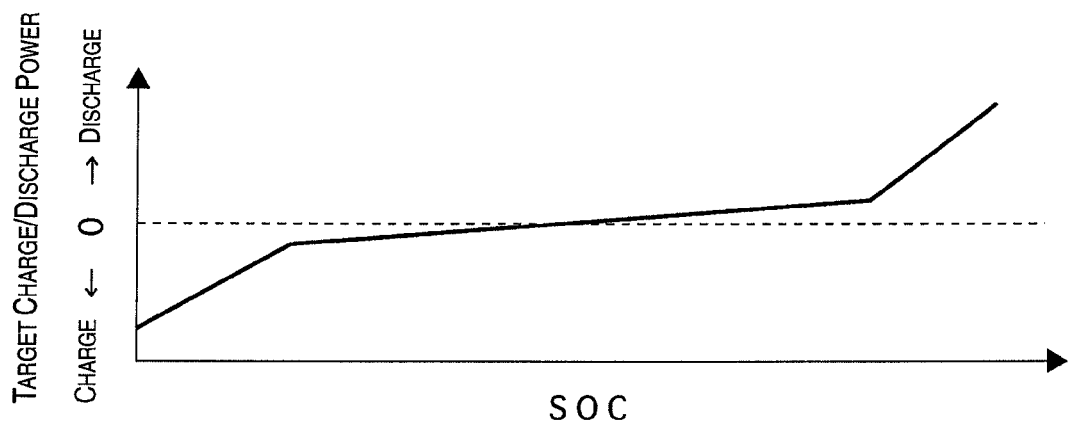
F I G. 5

| | C1 | C2 | C3 | B1 | B2 | B3 | B4 | F1 | F2 | F3 |
|---|---|---|---|---|---|---|---|---|---|---|
| 1st | | (○)* | | | ● | (○) | ○ | | △ | △ |
| 2nd | | | ○ | | (○) | (○) | ○ | | △ | △ |
| 3rd | | ○ | ○ | | (○) | | ● | C | △ | |
| 4th | ○ | ○ | ○ | | | | ● | C | | |
| 5th | ○ | ○ | | | ○ | | ● | C | C | |
| Rev | | ○ | | ○ | ○ | | | | △ | △ |

△ : Contributes To Torque Transfer When Vehicle Is Powered On
C : Contributes To Torque Transfer During Coasting
● : Hydraulic Pressure Is Supplied, But Does Not Affect Output
(○) : Engaged In Overrun Mode
(○)* : Engaged When Gear Is Selected. Afterwards, Disengaged Except During Overrun Mode
○ : Engaged

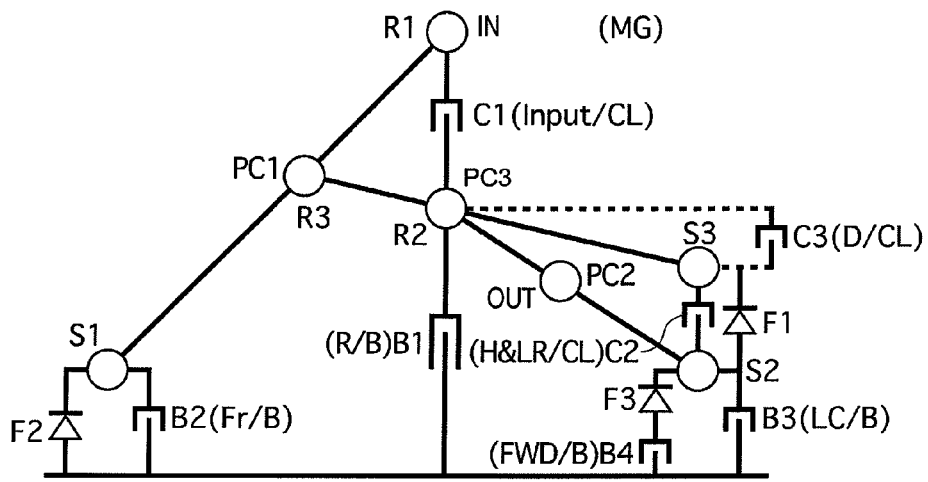
F I G. 9
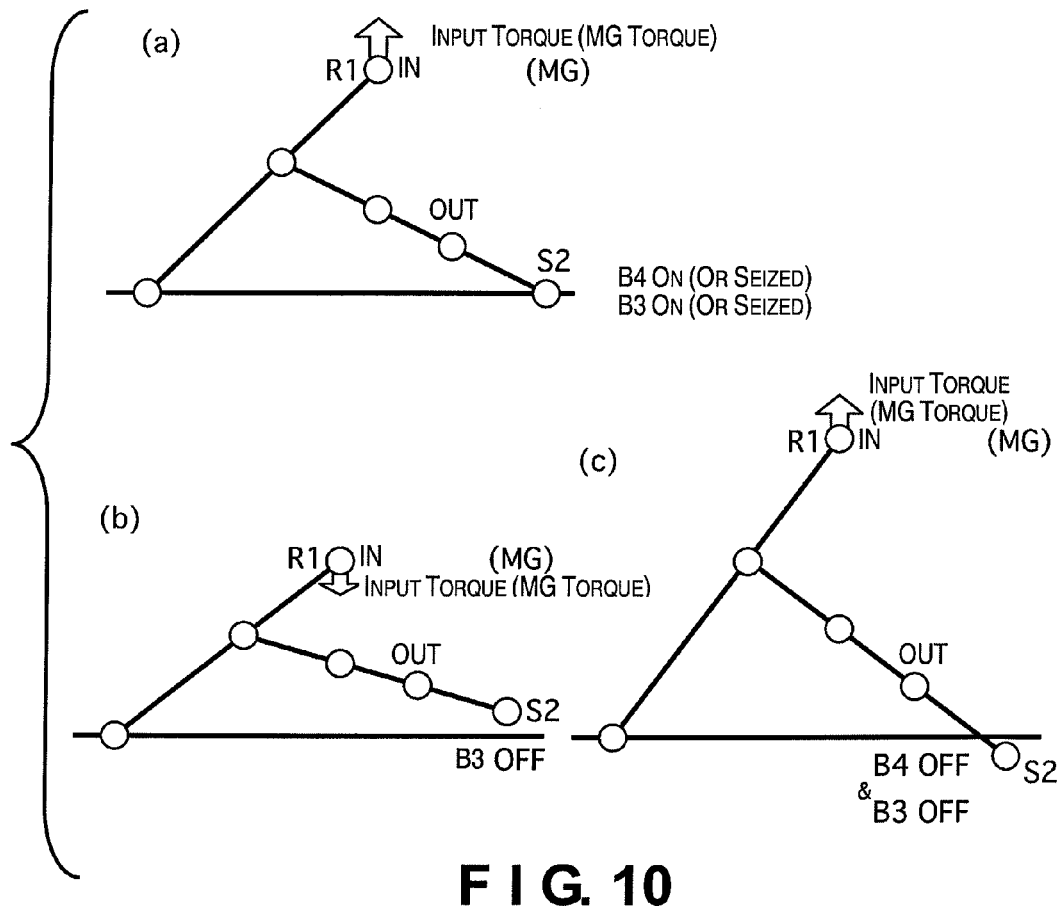
F I G. 10

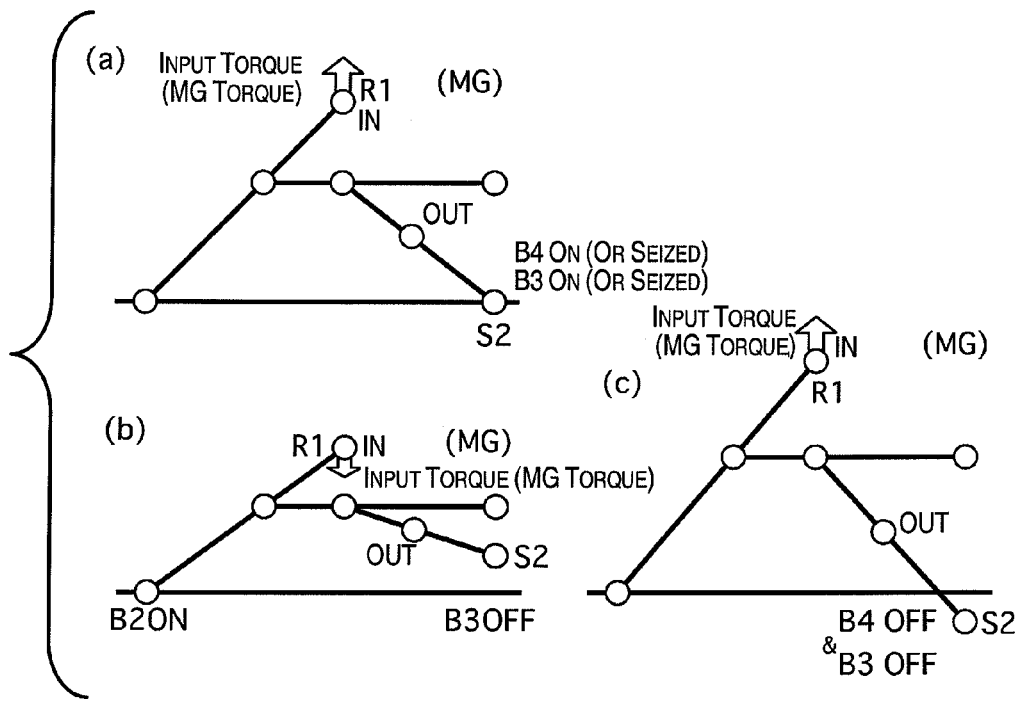
F I G. 11
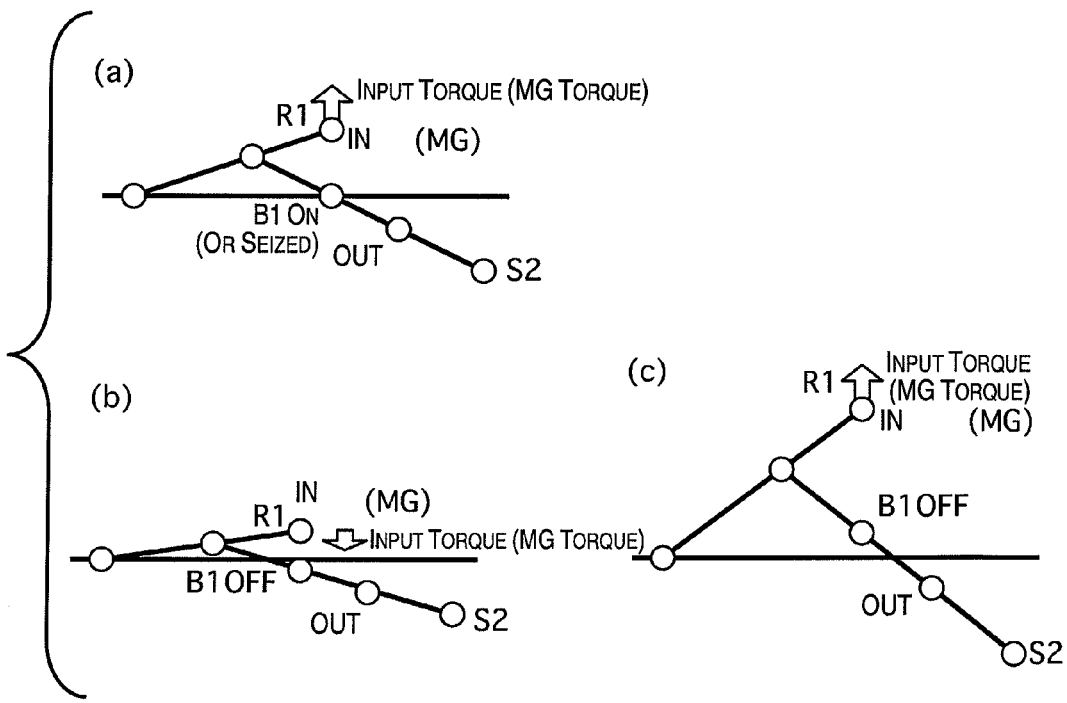
F I G. 12

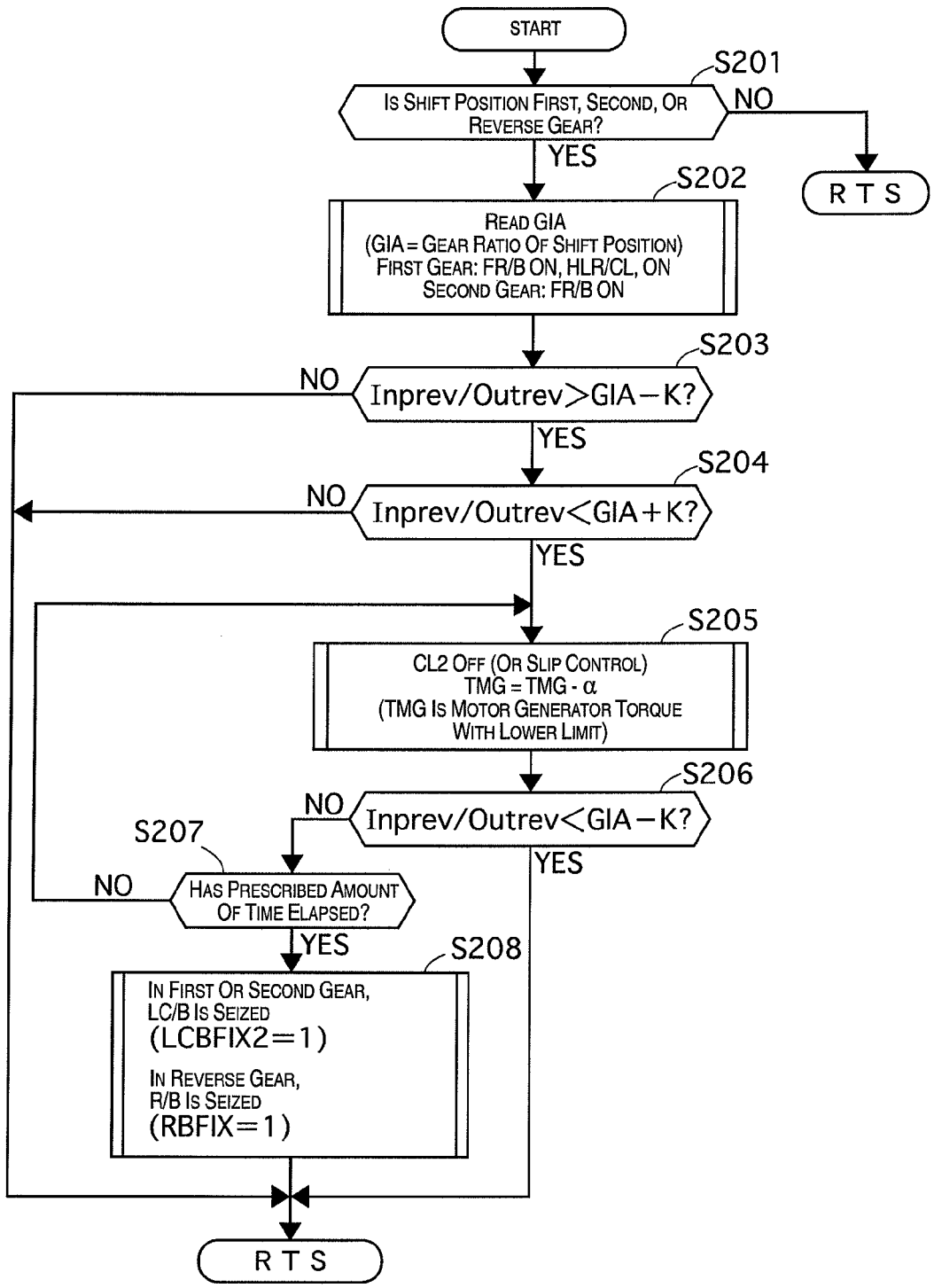
F I G. 14

HYBRID VEHICLE CONTROL APPARATUS

CROSS-REFERENCE TO RELATED APPLICATIONS

This application claims priority to Japanese Patent Application Nos. 2006-198942, filed on Jul. 21, 2006 and 2007-149864, filed on Jun. 6, 2007. The entire disclosure of Japanese Patent Application Nos. 2006-198942 and 2007-149864 are hereby incorporated herein by reference.

BACKGROUND OF THE INVENTION

1. Field of the Invention

The present invention relates to a hybrid vehicle control apparatus for a hybrid vehicle having an engine and a motor as power sources.

2. Background Information

Japanese Laid-Open Patent Application Publication No. 2001-255285 discloses a conventional hybrid vehicle having a first engaging element that selectively engages or disengages an engine and a motor, and a second engaging element that selectively engages or disengages the motor and a drive wheel. The conventional hybrid vehicle operates in one of a motor drive mode in which the motor alone is used as a power source and a hybrid drive mode in which the engine is also included as a power source. Therefore, the fuel efficiency (fuel consumption) of the vehicle is improved by switching the drive mode in accordance with a running state of the vehicle.

In view of the above, it will be apparent to those skilled in the art from this disclosure that there exists a need for an improved hybrid vehicle control apparatus. This invention addresses this need in the art as well as other needs, which will become apparent to those skilled in the art from this disclosure.

SUMMARY OF THE INVENTION

In the conventional hybrid vehicle described in the above mentioned reference, when the demand for drive force is high, there are times when the conventional hybrid vehicle needs to be driven in the hybrid drive mode (i.e., using both the engine and the motor). Since the conventional hybrid vehicle is not provided with a torque converter or other device that absorbs rotation of the engine, the vehicle speed is determined by the rotational speed of the engine when the first engaging element and the second engaging element are both completely engaged. Generally, a minimum rotational speed (lower limit) is set for the idle speed required for the engine to maintain independent rotation, and this minimum rotational speed becomes higher when the idle speed increases in order to warm up the engine. In some situations, operation of the engine is necessary in order to obtain the required driving force (power). However, operating the engine at or above the minimum rotational speed would result in too much power being delivered to the drive wheels. In such situations, in the conventional hybrid vehicle, the engine is started and operated while controlling the second engaging element in a slipping state, thereby allowing the engine to be used during acceleration from a stop (the setting the vehicle into motion from a stopped state) and low speed travel without transferring too much torque from the engine to the drive wheels.

However, if the slip control of the second engaging element is executed when the second engaging element is heated, there is the possibility that the second engaging element will seize or fix due to further heating. If normal slipping control is executed without detecting that the second engaging element is seized, then the following problems could possibly occur. First, unintended engine braking could occur during coasting, thus degrading the driving performance. Second, when the engine is started and the drive mode is switched from the motor drive mode to the engine drive mode, there is the possibility that a change in the drive force of the motor/generator will be transmitted to the output shaft and cause the drive force imparted to the drive wheels to change. Third, when the vehicle is set into motion from a stopped state using the engine in conjunction with the motor/generator, there is the possibility that the slip control will not result in sufficient slippage of the second engaging element, and the engine will stall or unpleasant vibrations will occur.

The present invention was conceived in view of the above listed problems. One object of the present invention is to provide a hybrid vehicle control apparatus that is configured and arranged to determine if the second engaging element is seized.

In order to achieve the aforementioned object, a hybrid vehicle control apparatus is provided that includes an engine, a motor, a first engaging element, a second engaging element, an input rotational speed and a controller. The first engaging element is arranged between the engine and the motor to selectively connect and disconnect the engine and the motor. The second engaging element is arranged between the motor and a drive wheel of a vehicle to selectively connect and disconnect the motor and the drive wheel. The input rotational speed detecting section is configured and arranged to detect an input rotational speed of the second engaging element corresponding to a rotational speed of the motor. The controller is configured to determine whether the second engaging element is seized based on the input rotational speed detected by the rotational speed detecting section when one of a disengagement command and a slip engagement command has been issued to the second engaging element and a drive force of at least one of the engine and the motor has been changed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 1 is an overall schematic block diagram of a control system of a rear wheel drive hybrid vehicle equipped with a hybrid vehicle control apparatus in accordance with one embodiment of the present invention;

FIG. 4 is an EV-HEV selection map used by a mode selecting section shown in FIG. 2 to select a target mode in accordance with the illustrated embodiment of the present invention;

FIG. 5 is a target charge/discharge amount map used by a target charge/discharge computing section shown in FIG. 2 to compute a target charge/discharge power in accordance with the illustrated embodiment of the present invention;

FIG. 9 is a common velocity diagram for the automatic transmission of the hybrid vehicle in accordance with the illustrated embodiment of the present invention;

FIG. 10 is a series of diagrams (a) to (c) illustrating how the common velocity diagram changes when the automatic transmission is in first gear in accordance with the illustrated embodiment of the present invention;

FIG. 11 is a series of diagrams (a) to (c) illustrating how the common velocity diagram changes when the automatic transmission is in second gear in accordance with the illustrated embodiment of the present invention;

FIG. 12 is a series of diagrams (a) to (c) illustrating how the common velocity diagram changes when the automatic transmission is in reverse gear in accordance with the illustrated embodiment of the present invention;

FIG. 14 is a flowchart showing a second seizure determination control executed by the hybrid vehicle control apparatus in accordance with the illustrated embodiment of the present invention.

DETAILED DESCRIPTION OF THE PREFERRED EMBODIMENTS

Figure 2:
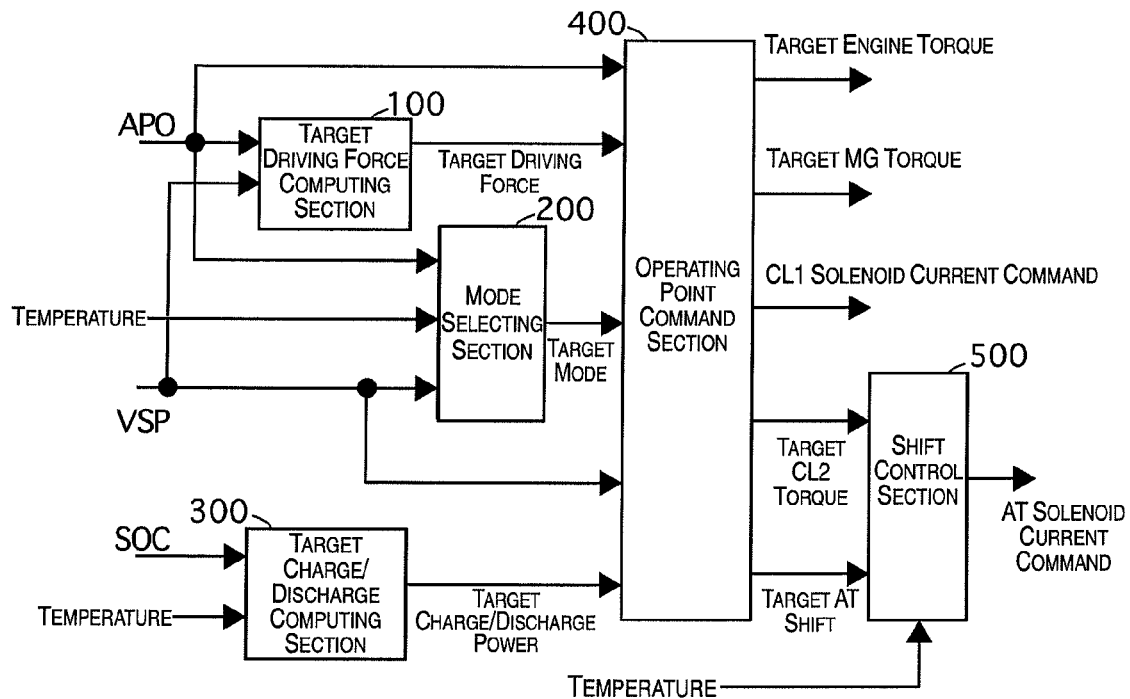
FIG. 2 is a control block diagram illustrating the computer programming executed by an integrated controller of the hybrid vehicle control apparatus in accordance with the illustrated embodiment of the present invention.

Selected embodiment of the present invention will now be explained with reference to the drawings. It will be apparent to those skilled in the art from this disclosure that the following descriptions of the embodiment of the present invention is provided for illustration only and not for the purpose of limiting the invention as defined by the appended claims and their equivalents.

Referring initially to FIG. 1, a drive train of a hybrid vehicle having a hybrid vehicle control apparatus in accordance with an illustrated embodiment of the present invention is explained. In this example, the hybrid vehicle is arranged as a rear wheel drive hybrid vehicle. FIG. 1 is an overall schematic block diagram showing a drive train control system of the hybrid vehicle. As shown in FIG. 1, the drive train of the hybrid vehicle in the illustrated embodiment includes an internal combustion engine E, a first clutch CL1 (first engaging element), a motor/generator MG, a second clutch CL2 (second engaging element), an automatic transmission AT, a propeller shaft PS, a differential DF, a left drive shaft DSL, a right drive shaft DSR, a left rear wheel RL (drive wheel) and a right rear wheel RR (drive wheel). The hybrid vehicle also includes a left front wheel FL and a right front wheel FR.

The drive train control system of the hybrid vehicle includes an engine controller 1, a motor controller 2, an inverter 3, a battery 4, a first clutch controller 5, a first clutch hydraulic pressure unit 6, an AT (automatic transmission) controller 7, a second clutch hydraulic pressure unit 8, a brake controller 9 and an integrated controller 10. The engine controller 1, the motor controller 2, the first clutch controller 5, the AT controller 7, the brake controller 9, and the integrated controller 10 are connected to one another with a CAN communication line 11 so that the controllers can exchange information. Moreover, the hybrid vehicle is provided with an engine speed sensor 12, a resolver 13, a first clutch hydraulic pressure sensor 14, a first clutch stroke sensor 15, an accelerator position switch 16, a vehicle speed sensor 17, a second clutch hydraulic pressure sensor 18, a wheel speed sensor 19, a brake stroke sensor 20, a motor rotational speed sensor 21, a second clutch output rotational speed sensor 22, a second clutch torque sensor 23, a brake fluid pressure sensor 24, an input shaft rotational speed sensor 25 (one example of an input rotational speed detecting section), an output shaft rotational speed sensor 26 (one example of an output rotational speed detecting section), and an inhibitor switch 7a.

The engine E is, for example, a conventional gasoline engine. The opening degree of a throttle valve of the engine E is preferably controlled based on a control command from the engine controller 1 as discussed in more detail below. A flywheel FW is provided on an output shaft of the engine E as shown in FIG. 1.

The first clutch CL1 is disposed between the engine E and the motor/generator MG. The first clutch CL1 is hydraulically controlled based a control command from the first clutch controller 5 as discussed in more detail below using hydraulic pressure produced by the first clutch hydraulic pressure unit 6. The first clutch CL1 is configured and arranged to be controlled to one of an engaged state, a disengaged state, and a slip engagement state (a partially engaged state in which slipping occurs).

The motor/generator MG is, for example, a conventional synchronous motor/generator having a rotor provided with permanent magnets embedded therein and a stator with a stator coil wound there-about. The motor/generator MG is controlled based on a control command issued from the motor controller 2 as discussed in more detail below by applying a three-phase alternating current supplied from the inverter 3. The motor/generator MG is configured and arranged to operate as an electric motor by receiving electric power from the battery 4 and delivering rotary drive force (i.e., power running mode). The motor/generator MG is also configured and arranged to operate as an electric generator that recharges the battery 4 when the rotor is rotated by an external force such that a voltage is induced across the ends of the stator coil (i.e., regeneration mode). The rotor of the motor/generator MG is connected to an input shaft of the automatic transmission AT through a damper (not shown).

The second clutch CL2 is disposed between the motor/generator MG and the left and right rear wheels RL and RR. The second clutch CL2 is hydraulically controlled based a control command from the AT (automatic transmission) controller 7 as discussed in more detail below using hydraulic pressure produced by the second clutch hydraulic pressure unit 8. The second clutch CL2 is configured and arranged to be controlled to one of an engaged state, a disengaged state, and a slip engagement state.

The automatic transmission AT is, for example, a conventional step-type automatic transmission having five forward speeds and one reverse speed. The automatic transmission AT is configured and arranged to automatically change the gear ratio based on such factors as the vehicle speed and the throttle opening. In the illustrated embodiment, the second clutch CL2 is not arranged as a single dedicated clutch that has been separately added to the automatic transmission AT.

Rather, the second clutch CL2 is formed by one or more of the frictional engaging elements that make up a plurality of frictional engaging elements that are engaged and disengaged as required in order to achieve the different speeds (gear ratios) of the automatic transmission AT. The input shaft rotational speed sensor 25 is operatively coupled to the automatic transmission AT, and configured and arranged to detect the rotational speed of the input shaft (i.e., the input shaft IN as discussed in more detail below) of the automatic transmission AT. The output shaft rotational speed sensor 26 is also operatively coupled to the automatic transmission AT, and configured and arranged to detect the rotational speed of the output shaft (i.e., the output shaft OUT as discussed in more detail below) of the automatic transmission AT. The operation of the automatic transmission AT will be explained in more detail below with reference to FIGS. 7 to 12.

The output shaft of the automatic transmission AT is connected to the propeller shaft PS that serves as a vehicle drive shaft, the differential DF, the left drive shaft DSL, the right drive shaft DSR, and the left and right rear wheels RL and RR. In the illustrated embodiment, the first clutch CL1 and the second clutch CL2 include, for example, conventional multi-plate wet clutches for which the flow rate and pressure of the hydraulic fluid can be controlled with proportional solenoids.

The hybrid drive train illustrated in FIG. 1 has three drive modes (first, second, and third drive modes) that are determined based on the engagement/disengagement status of the first clutch CL1 and the second clutch CL2. The first drive mode is a motor drive mode, i.e., an electric drive mode (hereinafter called "EV mode"), which is achieved by releasing the first clutch CL1 such that power supplied from the motor/generator MG is the sole power source for driving the vehicle. The second drive mode is an engine-employing drive mode or a hybrid drive mode (hereinafter called "HEV mode"), which is achieved by engaging the first clutch CL1 such that the engine E is also used as a power source to drive the vehicle. The third drive mode (hereinafter called "WSC mode") is achieved by engaging the first clutch CL1 and controlling the second clutch CL2 such that the second clutch CL2 slips to partially use the engine E in addition to the motor/generator MG to drive the vehicle.

Moreover, the HEV mode further includes an engine drive mode, a motor assist drive mode, and a power generating travel mode.

In the engine drive mode, the engine E serves as the sole drive source for moving the drive wheels RL and RR. In the motor assist drive mode, both the engine E and the motor/generator MG serve as drive sources for moving the drive wheels RL and RR. In the power generating travel mode, the engine E drives the drive wheels RR and RL while the motor/generator MG functions as an electric generator.

More specifically, during constant speed travel and during acceleration in the power generating travel mode, power from the engine E is used to operate the motor/generator MG as an electric generator. During deceleration, brake energy can be regenerated and used to drive the motor/generator MG as an electric generator and charge the battery 4.

Also, an additional drive mode (a generator mode) is provided in which the engine E drives the motor/generator MG as an electric generator when the vehicle is stopped.

The engine controller 1 is configured to receive engine rotational speed information from the engine speed sensor 12 and a target engine torque command from the integrated controller 10. The engine controller 1 is configured to compute a command for controlling the engine operating point (i.e., the engine speed Ne and the engine torque Te) based on the received engine rotational speed information and the target engine torque command, and to send the computed command to, for example, a throttle valve actuator (not shown). The engine rotational speed Ne and other information are fed to the integrated controller 10 through the CAN communication line 11.

The motor controller 2 is configured to receive information from the resolver 13 configured and arranged to detect the rotational position of the rotor of the motor/generator MG. The motor controller 2 is also configured to receive a target motor/generator torque command from the integrated controller 10. The motor controller 2 is configured to compute a command for controlling the motor operating point (i.e., the motor/generator rotational speed Nm and the motor/generator torque Tm) based on the received information and the target motor/generator torque command, and to send the computed command to the inverter 3. The motor controller 2 is configured to monitor the state of charge (SOC) of the battery 4 and to use the battery SOC information in controlling the motor/generator MG. The motor controller 2 is also configured to send the battery SOC information to the integrated controller 10 through the CAN communication line 11.

The first clutch controller 5 is configured to receive sensor information from the first clutch hydraulic pressure sensor 14 and the first clutch stroke sensor 15, and to receive a first clutch control command from the integrated controller 10. The first clutch controller 5 is configured to compute a command for controlling the engagement state (engaged or disengaged) of the first clutch CL1 based on the received information and the first clutch control command, and to send the computed command to the first clutch hydraulic pressure unit 6. The first clutch stroke C1S and other information are also fed to the integrated controller 10 through the CAN communication line 11.

The AT controller 7 is configured to receive sensor information from the accelerator position switch 16, the vehicle speed sensor 17, the second clutch hydraulic pressure sensor 18, the input shaft rotational speed sensor 25, the output shaft rotational speed sensor 26, and the inhibitor switch 7a. The inhibitor switch 7a is configured and arranged to output a signal corresponding to the position of a shift lever (not shown) operated by the driver. The AT controller 7 is also configured to receive a second clutch control command from the integrated controller 10. The AT controller 7 is configured to compute a command for controlling the engagement state (engaged, slip engaged, or disengaged) of the second clutch CL2 based on the received information and the second clutch control command, and to send the computed command to the second clutch hydraulic pressure unit 8, which is arranged inside an AT hydraulic pressure control valve. The accelerator pedal position APO, the vehicle speed VSP, and the information from the inhibitor switch 7a are also fed to the integrated controller 10 through the CAN communication line 11.

The brake controller 9 is configured to receive sensor information from the wheel speed sensor 19 that detects the speeds of the four wheels FL, FR, RL and RR and the brake stroke sensor 20. Based on the received information and a regenerative cooperative control command from the integrated controller 10, the brake controller 9 is configured to execute regenerative cooperative brake control such that, for example, when the brake pedal is depressed and the requested braking force corresponding the brake stroke BS cannot be realized with regenerative braking alone, a mechanical braking force (braking force generated with a frictional brake) is produced to supplement the amount by which the regenerative braking force is insufficient.

The integrated controller 10 is configured to manage the energy consumption of the vehicle as a whole and to run (drive) the vehicle at the maximum efficiency. The integrated controller 10 is configured to receive information from the motor rotational speed sensor 21 that detects the motor rotational speed Nm, the second clutch output rotational speed sensor 22 that detects the output rotational speed N2out of the second clutch CL2, the second clutch torque sensor 23 that detects the torque TCL2 of the second clutch CL2, the brake fluid pressure sensor 24, and the temperature sensor 10a that detects the temperature of the second clutch CL2. The integrated controller 10 is also configured to receive other information via the CAN communication line 11.

The integrated controller 10 is also configured to control the operation of the engine E by sending a control command to the engine controller 1, to control the operation of the motor/generator MG by sending a control command to the motor controller 2, to control the engagement state (engaged or disengaged) of the first clutch CL1 by sending a control command to the first clutch controller 5, and to control the engagement state (engaged, slip engaged, or disengaged) of the second clutch CL2 by sending a control command to the AT controller 7.

The integrated controller 10 preferably includes a microcomputer with a seizure compensation control program that controls the engine E, the motor/generator MG, the first clutch CL1, the second clutch CL2 and other various components of the hybrid vehicle as discussed below. The integrated controller 10 can also include other conventional components such as an input interface circuit, an output interface circuit, and storage devices such as a ROM (Read Only Memory) device and a RAM (Random Access Memory) device. The microcomputer of the integrated controller 10 is programmed to control the engine E, the motor/generator MG, the first clutch CL1, the second clutch CL2 and other various components. The memory circuit stores processing results and control programs such as ones for seizure determination control operation that are run by the processor circuit. The integrated controller 10 is operatively coupled to the engine controller 1, the motor controller 2, the first clutch controller 5, the AT controller 7 in a conventional manner. The internal RAM of the integrated controller 10 stores statuses of operational flags and various control data. The internal ROM of the integrated controller 10 stores various data for various operations. The integrated controller 10 is capable of selectively controlling any of the components of the control system in accordance with the control program. It will be apparent to those skilled in the art from this disclosure that the precise structure and algorithms for the integrated controller 10 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Referring now to the block diagram shown in FIG. 2, the control operations executed by the integrated controller 10 of the illustrated embodiment will now be explained. The control is executed by the integrated controller 10 at a control cycle time of, for example, 10 msec. The integrated controller 10 includes a target driving force computing section 100, a mode selecting section 200, a target charge/discharge computing section 300, an operating point command section 400, and a shift control section 500.

Figure 3:
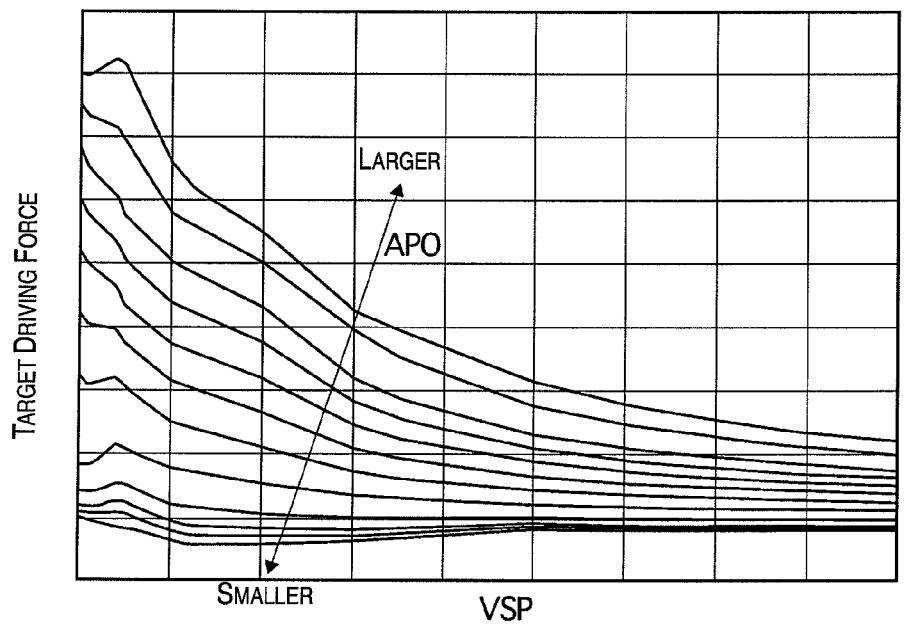
FIG. 3 is a target driving force map used by a target driving force computing section shown in FIG. 2 to compute a target driving force in accordance with the illustrated embodiment of the present invention.

The target driving force computing section 100 is configured to use the target driving force map such as one shown in FIG. 3 to compute a target driving force tFo0 based on the accelerator pedal position APO and the vehicle speed VSP.

The mode selecting section 200 is configured to use the EV-HEV selection map such as one shown in FIG. 4 to compute a target mode based on the accelerator pedal position APO and the vehicle speed VSP. However, if the battery SOC is equal to or below a prescribed value, the mode selecting section 200 is configured to automatically set the HEV mode as the target mode. The EV-HEV selection map includes a WSC mode region for outputting a large driving force when the accelerator pedal position (depression amount) APO is large during low speed travel as shown in FIG. 4.

The transition line for changing from HEV mode to WSC mode or from EV mode to WSC mode in the EV-HEV selection map in FIG. 4 is set such that when the automatic transmission AT is in first speed (first gear), the transition occurs when the vehicle speed VSP falls below a vehicle speed VSP corresponding to a rotational speed of the engine E that is lower than the idle speed of the engine E. The shaded (diagonal lines) region of FIG. 4 is the region where the drive mode changes from HEV mode to WSC mode, and the cross hatched region of FIG. 4 is the region where the drive mode changes from WSC mode to EV mode. When the battery SOC is low and the EV mode cannot be accomplished, the mode selecting section 200 is configured to select the WSC mode even if the vehicle is being started into motion from a stopped state.

The target charge/discharge computing section 300 is configured to use the target charge/discharge map such as one shown in FIG. 5 to compute a target charge/discharge power tP based on the battery SOC.

The operating point command section 400 is configured to compute a transitional target engine torque, a transitional target motor/generator torque, a transitional target second clutch engagement degree (torque transmission capacity), a transitional target gear (gear ratio) of the automatic transmission AT, and a transitional first clutch solenoid current command, which are set as final target values of the operating point, based on the accelerator pedal position APO, the target driving force tFo0, the target mode, the vehicle speed VSP, and the target charge/discharge power tP. The operating point command section 400 is provided with an engine start control section configured to start the engine E when the drive mode changes from the EV mode to the HEV mode.

The engine start control will now be explained. When conditions requiring the engine E to be started occur, the engagement degree of the second clutch CL2 is set to such a value that the second clutch CL2 transfers a torque equal to the output shaft torque existing before the engine E is started. At the same time, the drive force of the motor/generator MG is increased. Since the load acting on the motor/generator MG is equal to the torque transmission capacity of the second clutch CL2 (which is determined by the engagement degree), the rotational speed of the motor/generator MG increases due to the excess drive force. On the other hand, since the transmission output torque is determined by the engagement degree (torque transmission capacity) of the second clutch CL2, the transmission output torque does not change.

When it is estimated that the drive force of the motor/generator MG has been sufficiently increased (e.g., when the rotational speed of the motor/generator MG exceeds the rotational speed of the transmission AT by a prescribed amount), the engagement degree (torque transmission capacity) of the first clutch CL1 is increased to a prescribed value at which the engine E can be started quickly.

As the engagement degree of the first clutch CL1 is raised to the prescribed value, the load acting on the motor/generator MG increases, and thus, the torque output of the motor/generator MG increases. Since the prescribed value corresponds to a torque transmission capacity of the first clutch CL1 that is sufficient to transmit the torque required to start the engine E, the engine E starts cranking when the prescribed value is reached. The engine start control is completed when the engine E starts running independently. During the engine start control, the second clutch CL2 is continuously kept in a slipping state such that changes in the output torque of the transmission AT are suppressed or not transferred to the drive wheels RL and RR as much as possible.

Figure 6:
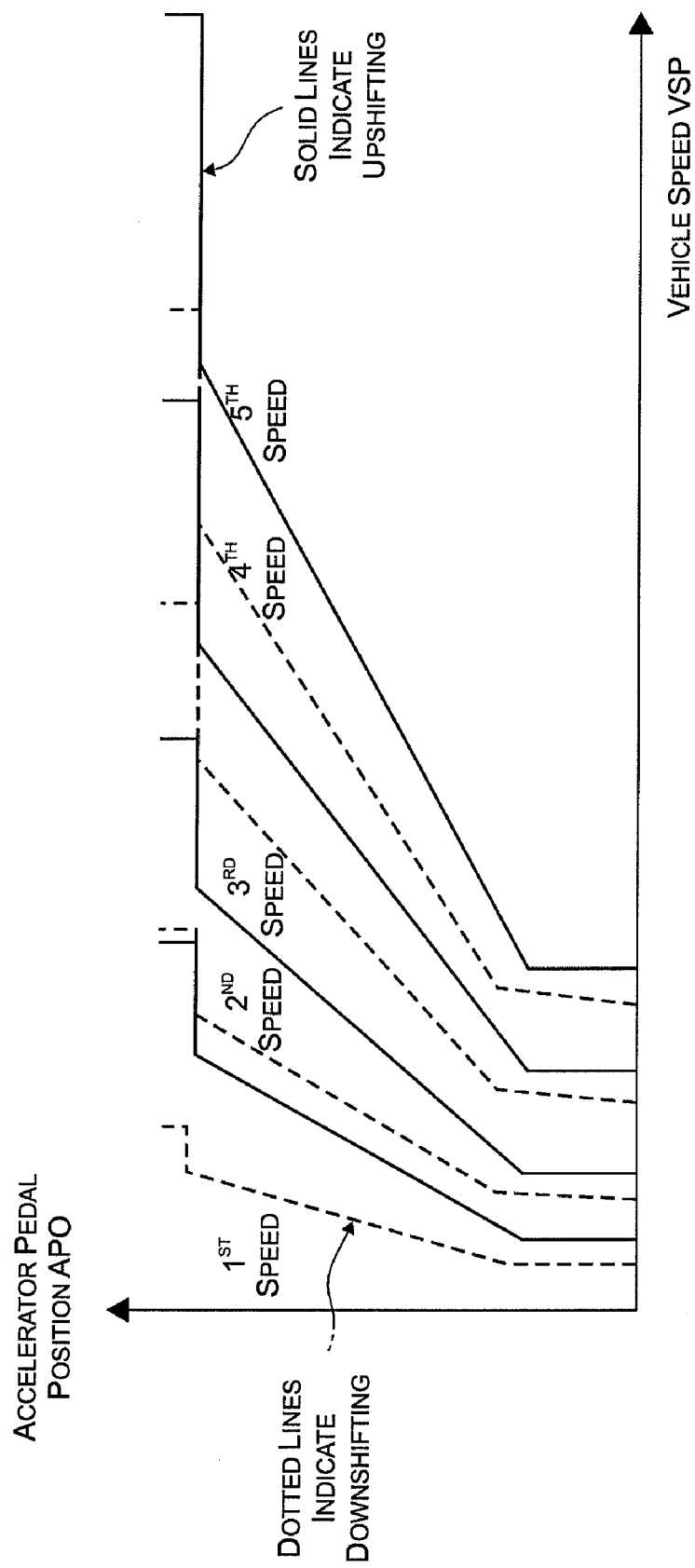
FIG. 6 is a normal shift map for an automatic transmission of the hybrid vehicle in accordance with the illustrated embodiment of the present invention.

The shift control section 500 is configured to control the solenoid valves inside the automatic transmission AT such that the target second clutch engagement degree and the target gear can be achieved in accordance with the shift schedule set by the shift map such as one shown in FIG. 6. The shift map shown in FIG. 6 assigns a target gear based on the vehicle speed VSP and the accelerator pedal position APO. In FIG. 6, the solid lines indicate upshift lines and the dotted lines indicate downshift lines.

Structure and Operation of Automatic Transmission

Figures 7, 8:
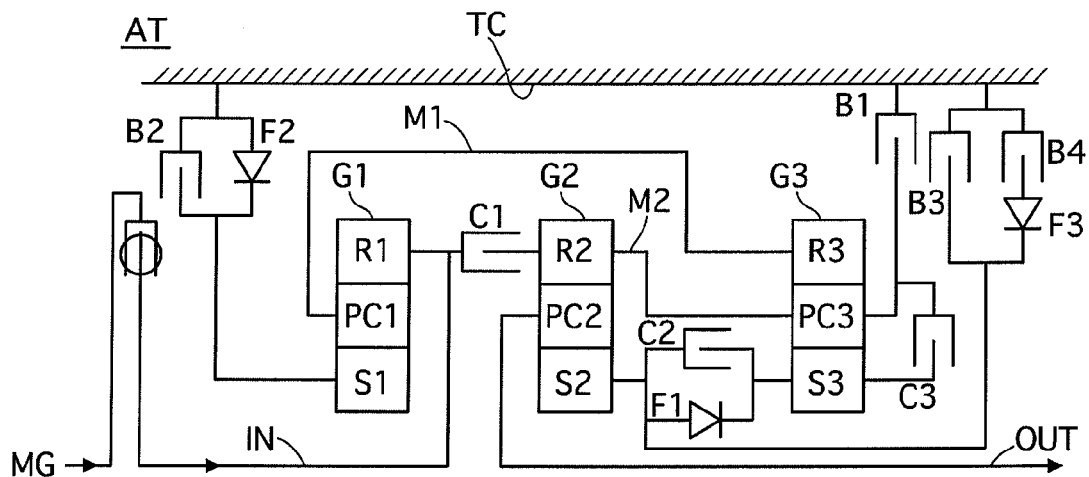
FIG. 7 is a simplified schematic view of the automatic transmission of the hybrid vehicle in accordance with the illustrated embodiment of the present invention.
FIG. 8 is an engaging element operation table for the automatic transmission of the hybrid vehicle in accordance with the illustrated embodiment of the present invention.

FIG. 7 is a skeleton diagram of the power train of the automatic transmission AT used in the drive train of the hybrid vehicle in accordance with the illustrated embodiment. FIG. 8 is a table indicating the operations of a plurality of clutches and a plurality of brakes of the automatic transmission AT. FIG. 9 is a common velocity diagram of the automatic transmission AT.

As shown in FIG. 7, the automatic transmission AT has three simple planetary gear sets including a front planetary gear set G1, a middle planetary gear set G2 and a rear planetary gear set G3. The front planetary gear set G1 has a front sun gear S1, a front carrier PC1, and a front ring gear R1 as rotary elements. The middle planetary gear set G2 has a middle sun gear S2, a middle carrier PC2, and a middle ring gear R2 as rotary elements. The rear planetary gear set G3 has a rear sun gear S3, a rear carrier PC3, and a rear ring gear R3 as rotary elements.

As shown in FIG. 7, the automatic transmission AT has an input shaft IN arranged to receive drive torque from the motor/generator MG alone or from the engine E and the motor/generator MG together through a damper. The automatic transmission AT also has an output shaft OUT arranged to output drive torque that has passed through the automatic transmission AT to the left and right front wheels RL and RR.

The automatic transmission also has a plurality of engaging elements for achieving the five forward speeds (gears) and the one reverse speed (gear) including an input clutch C1, a high and low reverse clutch C2, a direct clutch C3, a reverse brake B1, a front brake B2, a low coast brake B3, a forward brake B4, a first one-way clutch F1, a third one-way clutch F2, and a forward one-way clutch F3.

The input clutch C1 is arranged such that the front ring gear R1 is connected to the input shaft IN when the input clutch C1 is disengaged and both the front ring gear R1 and the middle ring gear R2 are connected to the input shaft IN when the input clutch C1 is engaged. The high and low reverse clutch C2 is arranged such that the middle sun gear S2 and the rear sun gear S3 are connected together when the high and low reverse clutch C2 is engaged. The direct clutch C3 is arranged such that the rear sun gear S3 is connected to the rear carrier PC3 when the direct clutch C3 is engaged.

The reverse brake B1 is arranged such that the rear carrier PC3 is fixed to the transmission case TC when the reverse brake B1 is engaged. The front brake B2 is arranged such that the front sun gear S1 is fixed to the transmission case TC when the front brake B2 is engaged. The low coast brake B3 is arranged such that the middle sun gear S2 is fixed to the transmission case TC when the low coast brake B3 is engaged. The forward brake B4 is arranged such that the middle sun gear S2 is fixed to the transmission case TC when the forward brake B4 is engaged.

The first one-way clutch F1 is arranged such that the rear sun gear S3 can rotate freely in the forward direction (same rotational direction as the engine E) with respect to the middle sun gear S2 while the rear sun gear S3 is prevented from rotating in the reverse direction with respect to the middle sun gear S2. The third one-way clutch F2 is arranged such that the front sun gear S1 can rotate freely in the forward direction while the front sun gear S1 cannot rotate in the reverse direction. The forward one-way clutch F3 is arranged such that the middle sun gear S2 can rotate freely in the forward direction while the middle sun gear S2 cannot rotate in the reverse direction.

The output shaft OUT is coupled directly to the middle carrier PC2. The front carrier PC1 and the rear ring gear R3 are coupled together directly by a first member M1. The middle ring gear R2 and the rear carrier PC3 are coupled together directly by a second member M2.

FIG. 10 is a series of diagrams (a) to (c) illustrating how the common velocity diagram changes when the automatic transmission AT is in first gear in accordance with the illustrated embodiment of the present invention. More specifically, the diagram (1) of FIG. 10 is a common velocity diagram for when the automatic transmission AT is in first gear. As shown in the engagement state table of FIG. 8, the front brake B2 and the forward brake B4 are both engaged when the automatic transmission AT is in first speed (first gear) under normal circumstances in which engine braking is not allowed. As a result, when the torque is received by the input shaft IN, the third one-way clutch F2, the front brake B2, and the forward one-way clutch F3 exert reaction forces and transfer the resulting driving force (drive torque) to the output shaft OUT. During coasting, if a driving force is received from the output shaft OUT, the forward one-way clutch F3 releases and engine braking is not performed.

On the other hand, when the automatic transmission AT is in first gear during overrun mode, in which engine braking is allowed, the high and low reverse clutch C2, the front brake B2, the low coast brake B3, and the forward brake B4 are all engaged. As a result, if a driving force is received from the output shaft OUT, the function of the one-way clutches is lost because the high and low reverse clutch C2 and the low coast brake B3 are engaged, and thus, engine braking is imparted.

FIG. 11 is a series of diagrams (a) to (c) illustrating how the common velocity diagram changes when the automatic transmission AT is in second gear in accordance with the illustrated embodiment of the present invention. More specifically, the diagram (a) of FIG. 11 is a common velocity diagram for when the automatic transmission AT is in second gear. As shown in the engagement state table of FIG. 8, the direct clutch C3 and the forward brake B4 are both engaged when the automatic transmission AT is in second speed (second gear) under normal circumstances in which engine braking is not allowed. As a result, when the torque is received by the input shaft IN, the third one-way clutch F2 and the forward one-way clutch F3 exert reaction forces and transfer the resulting driving force (drive torque) to the output shaft OUT. During coasting, if a driving force is received from the output shaft OUT, the forward one-way clutch F3 releases and engine braking is not performed. Similarly, even if the rotational speed of the input shaft IN decreases because the vehicle is coasting, engine braking is not performed because the third one-way clutch F2 releases.

On the other hand, when the automatic transmission AT is in second gear during overrun mode, in which engine braking is allowed, the direct clutch C3, the front brake B2, the low coast brake B3, and the forward brake B4 are all engaged. As a result, if a driving force is received from the output shaft OUT, the function of the one-way clutches is lost because the front brake B2 and the low coast brake B3 are engaged, and thus, engine braking is performed.

As shown in the engagement state table of FIG. 8, the third speed (third gear) of the automatic transmission AT is achieved by engaging the high and low reverse clutch C2, the direct clutch C3, the front brake B2, and the forward brake B4. The fourth speed (fourth gear) of the automatic transmission AT is achieved by engaging the input clutch C1, the high and low reverse clutch C2, the direct clutch C3, and the forward brake B4. The fifth speed (fifth gear) of the automatic transmission AT is achieved by engaging the input clutch C1, the high and low reverse clutch C2, the front brake B2, and the forward brake B4.

FIG. 12 is a series of diagrams (a) to (c) illustrating how the common velocity diagram changes when the automatic transmission AT is in reverse in accordance with the illustrated embodiment of the present invention. More specifically, the diagram (a) of FIG. 12 is a common velocity diagram for when the automatic transmission AT is in the reverse gear. As shown in the engagement state table of FIG. 8, the reverse gear of the automatic transmission AT is obtained by engaging the high and low reverse clutch C2, the reverse brake B1, and the front brake B2. As a result, when a torque is received from the input shaft IN, the output shaft OUT is rotated in the opposite direction as the input shaft IN because the reverse brake B1 is engaged. The high and low reverse clutch C2 and the front brake B2 are engaged because engine braking is always allowed in reverse. However, even if the reverse brake B1 alone is engaged, the reverse gear can be achieved due to the engagement of the third one-way clutch F2 and the first one-way clutch F1.

Operation of Second Clutch CL2

The operation of the second clutch CL2 will now be explained. As mentioned above, in the illustrated embodiment, the second clutch CL2 is formed by one or more of the frictional engaging elements (the clutches C1 to C3 and the brakes B1 to B4) that are respectively engaged or disengaged as required in order to achieve the different speeds (gear ratios) of the automatic transmission AT. In the illustrated embodiment, the forward brake B4 (an example of the first brake element) and the low coast brake B3 (an example of the second brake element) serve as the second clutch CL2 when the automatic transmission AT is in first gear or second gear. On the other hand, the high and low reverse clutch C2 serves as the second clutch CL2 when the automatic transmission AT is in third, fourth, or fifth gear. The reverse brake B1 serves as the second clutch CL2 (an example of the first and/or second brake element) when the automatic transmission AT is in reverse gear.

Seizure Determination Control

Figure 13:
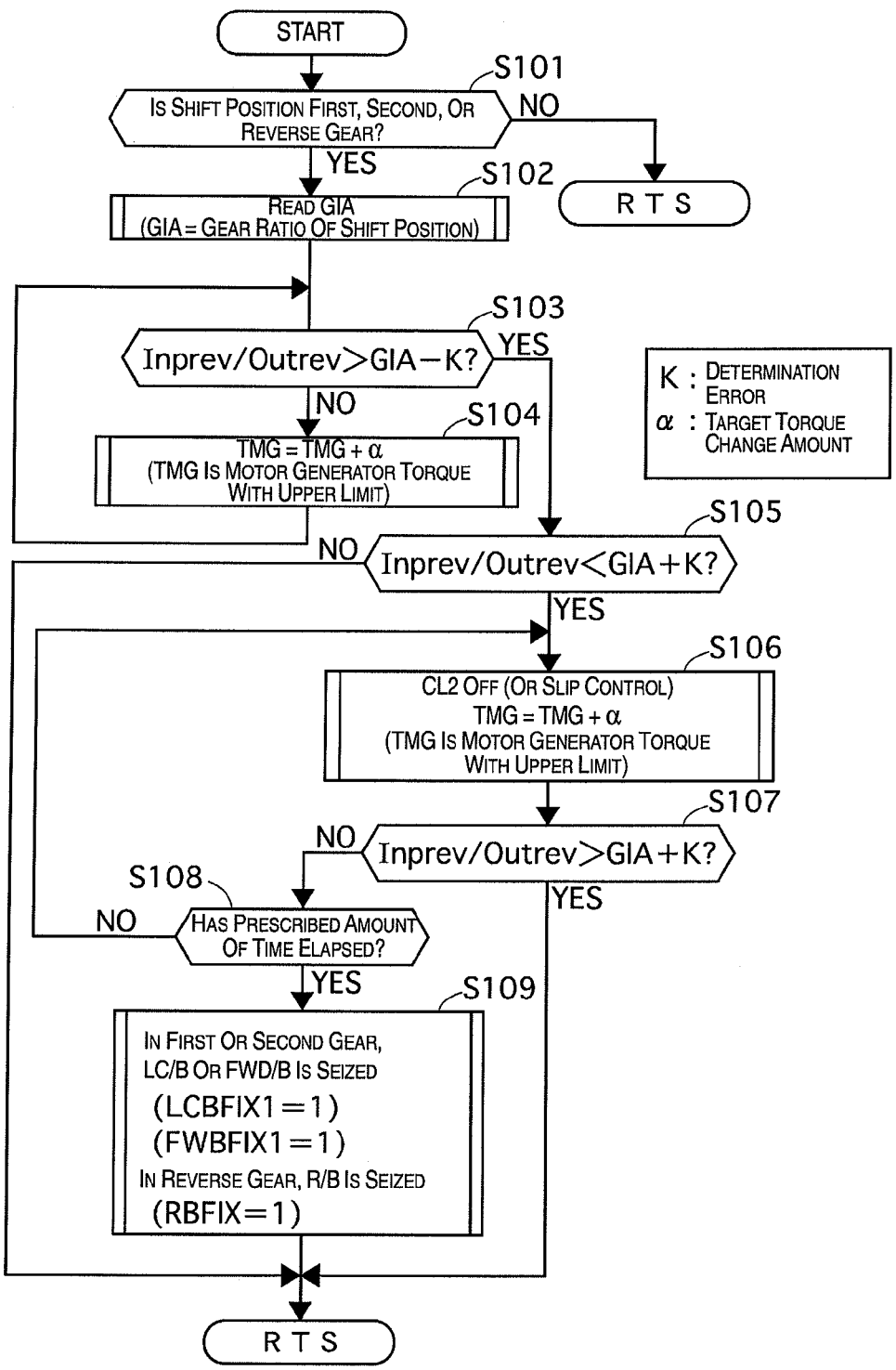
FIG. 13 is a flowchart showing a first seizure determination control executed by the hybrid vehicle control apparatus in accordance with the illustrated embodiment of the present invention.

The processing executed in order to determine if a seizure of the second clutch CL2 has occurred will now be explained. In this illustrated embodiment of the present invention, the seizure determination control is explained with an example of determining if a seizure of the second clutch CL2 has occurred when the automatic transmission AT is in one of first gear, second gear and reverse gear. FIG. 13 is a flowchart showing a first seizure determination control executed by the integrated controller 10 when the hybrid vehicle is in a drive state. The first seizure determination control is executed primarily when a driving force is being transferred from the automatic transmission AT to the drive wheels RL and RR (i.e., when the hybrid vehicle is in a drive state). The first seizure determination control is executed when the hybrid vehicle is in a drive state because the existence of the one-way clutches makes it impractical to determine if a seizure has occurred when the hybrid vehicle is coasting.

First Seizure Determination Control

In step S101, the integrated controller 10 is configured to determine whether the gear (shift position) selected by the automatic transmission AT is one of first gear, second gear and reverse gear. If none of first gear, second gear and reverse gear is the selected gear, the current cycle of the flowchart shown in FIG. 13 is ended. If the automatic transmission AT is in first gear, second gear, or reverse gear in step S101, then the control proceeds to step S102.

In step S102, the integrated controller 10 is configured to read a gear ratio GIA of the current shift position. The gear ratio GIA is a reference gear ratio set in advance for each gear (shift position) of the automatic transmission AT.

In step S103, the integrated controller 10 is configured to calculate an actual gear ratio (Inprev/Outrev) as the ratio of the rotational speed Inprev of the input shaft IN detected by the input shaft rotational speed sensor 25 and the rotational speed Outrev of the output shaft OUT detected by the output shaft rotational speed sensor 26. Then, the integrated controller 10 is configured to determine if the actual gear ratio is larger than the value obtained by subtracting a prescribed determination error K from the reference gear ratio GIA. If the actual gear ratio is larger than the resulting difference value (i.e., within a prescribed range of determination error) (Yes in step S103), then the control proceeds to step S105. If the actual gear ratio is not larger than the resulting difference value (i.e., not within a prescribed range of determination error) (No in step S103), then the control proceeds to step S104. In step S103, the value detected by the motor rotational speed sensor 21 provided in the motor/generator MG can be substituted in place of the rotational speed Inprev of the input shaft IN. Similarly, the value detected by the vehicle speed sensor 17 can be substituted in place of the rotational speed Outrev of the output shaft OUT.

In step S104, the integrated controller 10 is configured to add a target torque change amount α to the torque TMG of the motor/generator MG. The processing in step S104 is performed because, the actual gear ratio is calculated based on extremely small rotational speeds unless the vehicle is traveling with a certain degree of speed, and thus, the actual gear ratio will not fall within the prescribed range of determination error. Therefore, the motor torque TMG is increased by the target torque change amount α in step S104, and then the control returns to step S103. An upper limit is established for the torque TMG to prevent the torque TMG of the motor/generator MG from reaching an excessive value.

In step S105, the integrated controller 10 is configured to determine if the actual gear ratio (Inprev/Outrev) is smaller than the sum of the reference gear ratio GIA and the prescribed determination error K. If the actual gear ratio is smaller than the resulting sum (i.e., within a prescribed range of determination error) (Yes in step S105), then the control proceeds to step S106. If the actual gear ratio is not smaller than the resulting sum (i.e., not within a prescribed range of determination error) (No in step S105), the integrated controller 10 determines that the actual gear ratio is excessive and that one of the frictional engaging elements of the automatic transmission AT is slipping, i.e., undergoing a so-called "OFF failure." Then, the current control cycle shown in the flowchart of FIG. 13 ends.

In step S106, the integrated controller 10 is configured to control the AT controller 7 to turn the second clutch CL2 OFF (or to control the second clutch CL2 in a slipping state). In this example, the second clutch CL2 corresponds to the low coast brake B3 or the forward brake B4 if the current gear is in first gear or second gear, and the second clutch CL2 corresponds to the reverse brake B1 if the current gear is in reverse gear. Then, the integrated controller 10 is configured to add the change amount a to the motor/generator torque TMG.

In step S107, the integrated controller 10 is configured to determine if the actual gear ratio (Inprev/Outrev) is larger than the sum of the reference gear ratio GIA and the prescribed determination error K. If the actual gear ratio is larger than the resulting sum (Yes in step S107), then it is determined that the OFF state (or the slipping state) of the second clutch CL2 is properly performed and gear ratio has changed in response to increasing the motor/generator torque TMG in step S106. Therefore, the integrated controller 10 determines that the second clutch CL2 is normal and the current control cycle shown in the flowchart of FIG. 13 is ended. On the other hand, if the actual gear ratio is not larger than the resulting sum (No in step S107), then the control proceeds to step S108.

In step S108, the integrated controller 10 is configured to determine if a prescribed amount of time has elapsed. The control process in steps S106 and S107 is repeated until the prescribed amount of time elapses. If the actual gear ratio (Inprev/Outrev) remains equal to or smaller than the sum of the reference gear ratio GIA and the prescribed determination error K in step S107 for the entire duration of the prescribed amount of time, then the control proceeds to step S109 when the prescribed amount of time has elapsed in step S108.

In step S109, the integrated controller 10 is configured to determine that the low coast brake B3 or the forward brake B4 is seized if the current gear is first gear or second gear, and to set both of the values of a low coast brake seizure flag LCBFIX1 and a forward brake seizure flag FWBFIX1 to 1. The integrated controller 10 is configured to determine that the reverse brake B1 is seized if the current gear is reverse, and to set the value of a reverse brake seizure flag RBFIX to 1. Then, the current control cycle shown in the flowchart of FIG. 13 is ended.

Second Seizure Determination Control

FIG. 14 is a flowchart showing a second seizure determination control executed by the integrated controller 10 when the hybrid vehicle is in a coasting state. The second seizure determination control is executed primarily when a driving force is being transferred from the drive wheels to the automatic transmission AT (i.e., when the hybrid vehicle is in the coasting state). The purpose of performing the second seizure determination control is to identify seized elements that cannot be discovered while the vehicle is in a drive state.

In step S201, the integrated controller 10 is configured to determine whether the gear (shift position) selected by the automatic transmission AT is one of first gear, second gear and reverse gear. If none of first gear, second gear and reverse gear is the selected gear (No in step S201), the current control cycle of the flowchart shown in FIG. 14 is ended. If the automatic transmission AT is in one of first gear, second gear and reverse gear, then the control proceeds to step S202.

In step S202, the integrated controller 10 is configured to read the gear ratio GIA of the current shift position. As mentioned above, the gear ratio GIA is a preset reference gear ratio. Also, in step S202, the integrated controller 10 is configured to engage the front brake B2 and to engage the high and low reverse clutch C2 if the automatic transmission AT is in first gear, and the integrated controller 10 is configured to engage the front brake B2 if the automatic transmission AT is in second gear. The reason for engaging these clutches and brakes is that, when the automatic transmission AT is in first gear, the rotational speed of the middle sun gear S2 cannot be changed unless the functions of the first one-way clutch F1 and the third one-way clutch F2 are nullified (overridden). Similarly, when the automatic transmission AT is in second gear, the rotational speed of the middle sun gear S2 cannot be changed unless the function of the third one-way clutch F2 is nullified. These operations of the automatic transmission AT will be explained in more detail below.

In step S203, the integrated controller 10 is configured to calculate the actual gear ratio (Inprev/Outrev) as the ratio of the rotational speed Inprev of the input shaft IN and the rotational speed Outrev of the output shaft OUT. Then, the integrated controller 10 is configured to determine if the actual gear ratio is larger than the value obtained by subtracting the prescribed determination error K from the reference gear ratio GIA. If the actual gear ratio is larger than the resulting difference value (Yes in step S203), then the control proceeds to step S204. If the actual gear ratio is not larger than the resulting difference value (No in step S203), then the integrated controller 10 determines that the gear ratio is abnormal because one of the frictional engaging elements is in an OFF failure state, and the current control cycle shown in the flowchart of FIG. 14 is ended.

In step S204, the integrated controller 10 is configured to determine if the actual gear ratio (Inprev/Outrev) is smaller than the sum of the reference gear ratio GIA and the prescribed determination error K. If the actual gear ratio is smaller than the resulting sum (i.e., within a prescribed range of determination error) (Yes in step S204), then the control proceeds to step S205. If the actual gear ratio is not smaller than the resulting sum (i.e., not within a prescribed range of determination error) (No in step S204), the integrated controller 10 determines that the actual gear ratio is excessive and that one of the engaging elements is slipping, i.e., undergoing a so-called OFF failure. Then, the current control cycle shown in the flowchart of FIG. 14 is ended.

In step S205, the integrated controller 10 is configured to control the AT controller 7 to turn the second clutch CL2 OFF (or to control the second clutch CL2 in a slipping state) and to subtract the change amount a from the motor/generator torque TMG. In this example, the second clutch CL2 corresponds to the low coast brake B3 if the current gear is in first gear or second gear, and the second clutch CL2 corresponds to the reverse brake B1 if the current gear is in reverse gear. A lower limit is established for the torque TMG to prevent the torque TMG from reaching an excessively small value.

In step S206, the integrated controller 10 is configured to determine if the actual gear ratio (Inprev/Outrev) is smaller than the value obtained by subtracting the prescribed determination error K from the reference gear ratio GIA. If the actual gear ratio is smaller than the resulting difference (Yes in step S206), it is determined that the OFF state (or slipping state) of the second clutch CL2 is properly performed and gear ratio has changed in response to decreasing the motor/generator torque TMG in step S205. Therefore, the integrated controller 10 is configured to determine that the second clutch CL2 is normal and the current control cycle shown in the flowchart of FIG. 14 is ended. On the other hand, if the actual gear ratio is smaller than the resulting difference in step S206 (No in step S206), then the control proceeds to step S207.

In step S207, the integrated controller 10 is configured to determine if a prescribed amount of time has elapsed. The control process in steps S205 and S206 is repeated until the prescribed amount of time elapses. If the actual gear ratio (Inprev/Outrev) remains equal to or larger than the value obtained by subtracting the prescribed determination error K from the reference gear ratio GIA for the entire duration of the prescribed amount of time, then the control proceeds to step S208 when the prescribed amount of time has elapsed in step S207.

In step S208, the integrated controller 10 is configured to determine that the low coast brake B3 has seized if the current gear is first gear or second gear, and to set the value of a low coast brake seizure flag LCBFIX2 to 1. The integrated controller 10 is configured to determine that the reverse brake B1 is seized if the current gear is reverse gear, and to set the value of a reverse brake seizure flag RBFIX to 1.

Operational Effects of First and Second Seizure Determination Controls

The operational effects obtained by the first and second seizure determination controls will now be explained. As described previously, during WSC mode, the second clutch CL2 is controlled in a slipping state (slip control) and can easily become heated. If the slip control is ended and the second clutch CL2 is put into a fully engaged state while the second clutch CL2 is heated, there is a possibility that the second clutch CL2 will seize. The operational effects of the seizure determination controls will be described separately for cases in which the automatic transmission AT is in first gear, second gear and reverse gear.

First Gear

As shown in the diagram (a) of FIG. 10, when the automatic transmission AT is in first gear, seizure of the second clutch CL2 indicates that the forward brake B4 or the low coast brake B3 has seized.

When the hybrid vehicle is in EV mode and conditions requiring the engine E to be started have occurred, the second clutch CL2 is controlled to a slipping state and the drive force of the motor/generator MG is increased. On the other hand, the engagement degree (torque transmission capacity) of the first clutch CL1 is gradually increased until the engine E is cranked. If the second clutch CL2 is seized, then the increased drive force of the motor/generator MG will be transmitted entirely to the output shaft OUT and the resulting change in driving force transmitted to the drive wheels RL and RR could cause the driver to experience a feeling that something is odd about the vehicle.

When the first seizure determination control is performed when the automatic transmission AT is in first gear under normal traveling circumstances in which engine braking is not allowed, the forward brake B4 is controlled to in a disengaged state or in a slipping state such that the torque transmission capacity is just enough to transmit the current drive torque and the drive force of the motor/generator MG is increased (step S106 in FIG. 13). Accordingly, the rotational speed of the input shaft IN increases, and thus, the rotational speed of the rear ring gear R3 increases as shown in the diagram (c) of FIG. 10. Since the inertia of the vehicle prevents the rotational speed of the output shaft OUT from changing, the rigid lever of the common velocity diagram rotates about the output shaft OUT such that the rotational speed of the rear carrier PC3 increases and the rotational speed of the middle sun gear S2 decreases (to a negative value) as shown in the diagram (c) of FIG. 10.

In other words, if the forward brake B4 is not seized, then the rotational speed Outrev of the output shaft OUT will not change and the rotational speed Inprev of the input shaft IN will increase such that the gear ratio (Inprev/Outrev) becomes larger than the gear ratio of first gear.

Therefore, it can be determined that the forward brake B4 is not seized if the gear ratio changes (increases) by an amount equal to or larger than a prescribed value. On the other hand, it can be determined that the forward brake B4 is seized if the gear ratio changes by an amount smaller than the prescribed value.

The operational effect obtained by the second seizure determination control in first gear will now be explained. If the low coast brake B3 is seized, then the function of the forward one-way clutch F3 will be lost (nullified). Consequently, strong engine braking will occur during coasting in first gear even under normal conditions in which engine braking is not allowed. In such case, the driver may experience a feeling that there is something odd about the vehicle. In the first seizure determination control as explained above, the forward brake B4 is controlled to a slipping state and the drive force of the motor/generator MG is increased in order to determine if a seizure has occurred. However, if the vehicle is coasting in an overrun mode in which engine braking is allowed, then the forward brake B4 and the low coast brake B3 are both engaged and it is not possible to determine which brake is seized with the first seizure determination control.

Therefore, the second seizure determination control is performed to determine if a seizure has occurred by controlling the low coast brake B3 to a slipping state and decreasing the drive force of the motor/generator MG.

As shown in the diagram (b) of FIG. 10, when the vehicle is traveling in first gear in an overrun mode in which engine braking is allowed, i.e., when the vehicle is coasting, the low coast brake B3 is controlled in a disengaged state or in a slipping state with just enough torque transmission capacity to transmit the current driven torque (i.e., the upstream torque transmitted to the automatic transmission AT from the drive wheels RL and RR) and the drive force of the motor/generator MG is lowered (step S205 of FIG. 14). Accordingly, the rotational speed of the input shaft IN decreases, and thus, the rotational speed of the rear ring gear R3 decreases. Since the inertia of the vehicle prevents the rotational speed of the output shaft OUT from changing, the rigid lever of the common velocity diagram rotates about the output shaft OUT such that the rotational speed of the rear carrier PC3 decreases and the rotational speed of the middle sun gear S2 increases as shown in the diagram (b) of FIG. 10.

In other words, if the low coast brake B3 is not seized, then the rotational speed Outrev of the output shaft OUT will not change and the rotational speed Inprev of the input shaft IN will decrease such that the gear ratio (Inprev/Outrev) becomes smaller than the gear ratio of first gear. Therefore, it can be determined that the low coast brake B3 is not seized if the gear ratio changes (decreases) by an amount equal to or larger than a prescribed value. On the other hand, it can be determined that the low coast brake B3 is seized if the gear ratio changes by an amount smaller than the prescribed value.

Thus, the first seizure determination control can be used when the vehicle is in a drive state (state in which drive torque is being transmitted to the drive wheels RL and RR) to determine if the forward brake B4 is seized and the second seizure determination control can be used when the vehicle is in a coasting state to determine if the low coast brake B3 is seized. In this way, seizure determination control can be executed in accordance with a variety of running states.

Second Gear

As shown in the diagram (a) of FIG. 11, when the automatic transmission AT is in second gear, similarly to when the automatic transmission AT is in first gear, the seizure of the second clutch CL2 indicates that the forward brake B4 or the low coast brake B3 has seized. Since the operational effects of the first and second seizure determination controls are basically the same as when the automatic transmission AT is in first gear, the first seizure determination control and the second seizure determination control can be used in the same manner, as shown in the diagrams (c) and (b) of FIG. 11. The only difference is that when the rotational speed of the motor/generator MG is changed and, as a result, the rotational speed of the rear ring gear R3 changes, the rotational speed of the rear carrier PC3 also changes because the rear carrier PC3 rotates at the same speed as the rear ring gear R3. Therefore, the change in the gear ratio when the automatic transmission AT is in second gear is larger than when the automatic transmission AT is in first gear.

Reverse Gear

As shown in the diagram (a) of FIG. 12, when the automatic transmission AT is in reverse gear, seizure of the second clutch CL2 indicates that the reverse brake B1 has seized. When the reverse gear has been selected and the vehicle is started into motion using the engine E in conjunction with the motor/generator MG, the idle speed serves as a lower limit value of the engine speed. Under such conditions, the vehicle can be driven at speeds corresponding to engine speeds lower than the idle speed by controlling the reverse brake B1 in a slipping state. In such a situation, if the reverse brake B1 is seized, it will not be possible to release the reverse brake B1 immediately before the vehicle stops and the engine E will stall or vibrations will occur, causing the driver to experience a feeling that something is odd about the vehicle.

When the first seizure determination control is performed when the automatic transmission AT is in reverse gear, the reverse brake B1 is controlled in a disengaged state or in a slipping state such that the torque transmission capacity is just enough to transmit the current drive torque and the drive force of the motor/generator MG is increased (step S106 of FIG. 13), as shown in the diagram (c) of FIG. 12. The rotational speed of the input shaft IN increases, and thus, the rotational speed of the rear ring gear R3 increases. Since the inertia of the vehicle prevents the rotational speed of the output shaft OUT from changing, the rigid lever of the common velocity diagram rotates about the output shaft OUT such that the rotational speed of the rear carrier PC3 increases and the rotational speed of the middle sun gear S2 decreases (to a negative value) as shown in the diagram (c) of FIG. 12.

In other words, if the reverse brake B1 is not seized, then the rotational speed Outrev of the output shaft OUT will not change and the rotational speed Inprev of the input shaft IN will increase such that the gear ratio (Inprev/Outrev) becomes larger than the gear ratio of the reverse gear. Therefore, it can be determined that the reverse brake B1 is not seized if the gear ratio changes (increases) by an amount equal to or larger than a prescribed value. On the other hand, it can be determined that the reverse brake B1 is seized if the gear ratio changes by an amount smaller than the prescribed value.

The operational effect of the second seizure determination control will now be explained. The first seizure determination control is performed by controlling the reverse brake B1 to a slipping state and increasing the drive force of the motor/generator MG. Conversely, the second seizure determination control is accomplished by controlling the reverse brake B1 to a slipping state and decreasing the drive force of the motor/generator MG.

As shown in the diagram (b) of FIG. 12, when the vehicle is traveling in reverse gear, the reverse brake B1 is controlled in a disengaged state or in a slipping state with just enough torque transmission capacity to transmit the current driven torque (i.e., the upstream torque transmitted to the automatic transmission AT from the drive wheels) and the drive force of the motor/generator MG is lowered (step S205 of FIG. 14). Accordingly, the rotational speed of the input shaft IN decreases, and thus, the rotational speed of the rear ring gear R3 decreases. Since the inertia of the vehicle prevents the rotational speed of the output shaft OUT from changing, the rigid lever of the common velocity diagram rotates about the output shaft OUT such that the rotational speed of the rear carrier PC3 decreases and the rotational speed of the middle sun gear S2 increases as shown in the diagram (b) of FIG. 12.

In other words, if the reverse brake B1 is not seized, then the rotational speed Outrev of the output shaft OUT will not change and the rotational speed Inprev of the input shaft IN will decrease such that the gear ratio (Inprev/Outrev) becomes smaller than the gear ratio of the reverse gear. Therefore, it can be determined that the reverse brake B1 is not seized if the gear ratio changes (decreases) by an amount equal to or larger than a prescribed value. On the other hand, it can be determined that the reverse brake B1 is seized if the gear ratio changes by an amount smaller than the prescribed value. Thus, the first seizure determination control can be used when the vehicle is in a drive state and the second seizure determination control can be used when the vehicle is in a coasting state. In this way, seizure determinations can be executed in accordance with a variety of running states.

Engaging Element Seizure Identification Control in First Gear and Second Gear

Figure 15:
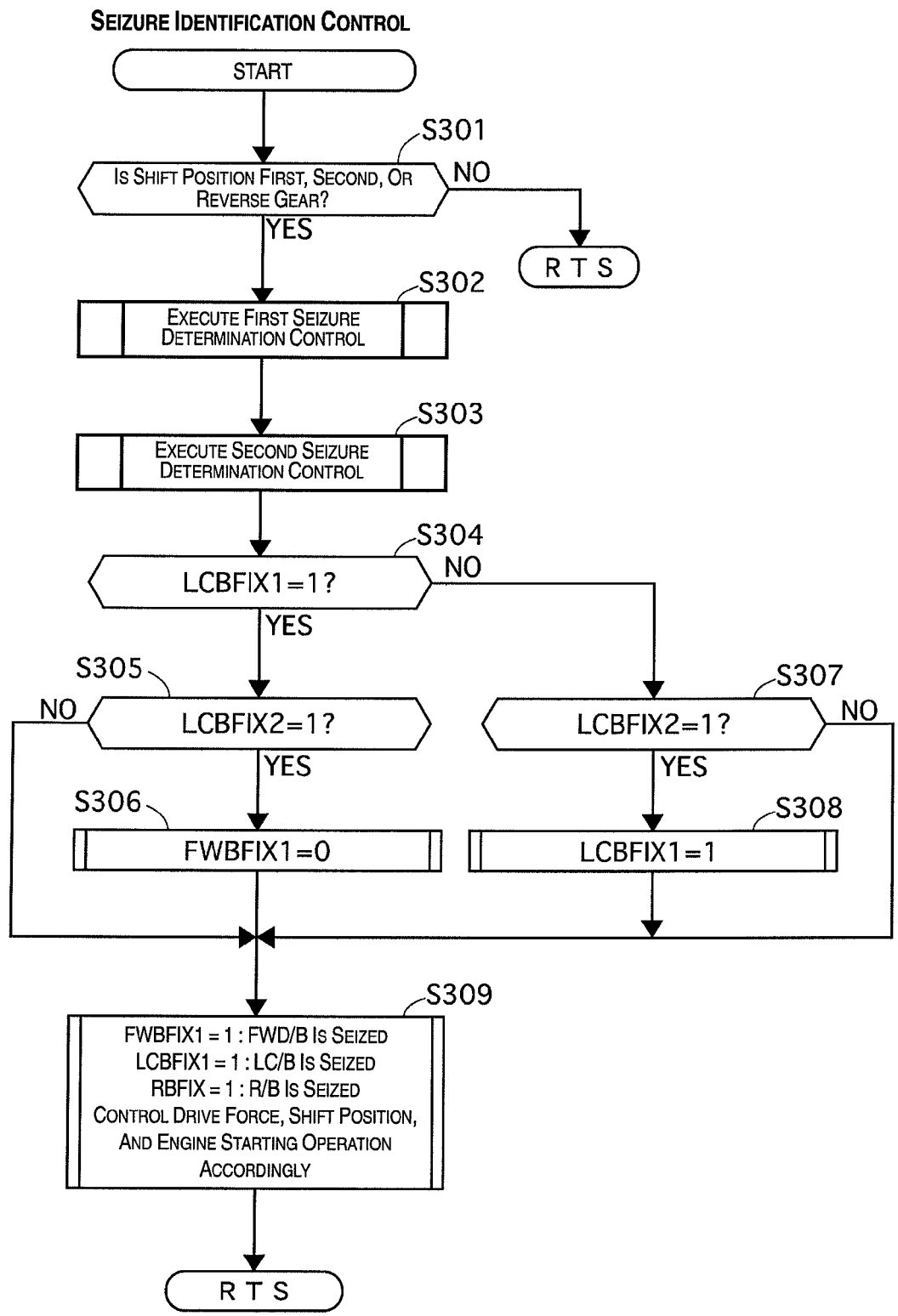
FIG. 15 is a flowchart showing a seizure identification control for identifying the seized engaging element by executing both the first seizure determination control and the second seizure determination control in accordance with the illustrated embodiment of the present invention.

FIG. 15 is a flowchart showing the control processing executed by the integrated controller 10 in order to identify which frictional engaging element of the automatic transmission AT (the second clutch CL2) is seized by executed both the first and the second seizure determination controls when the automatic transmission AT is in first or second gear.

In step S301, the integrated controller 10 is configured to determine whether the gear (shift position) selected by the automatic transmission AT is one of first gear and second gear. If neither of first gear and second gear is the selected gear (No in step S301), the current control cycle shown in the flowchart of FIG. 15 is ended. If the automatic transmission AT is in one of first gear and second gear (Yes in step S301), then the control proceeds to step S302.

In step S302, the integrated controller 10 is configured to execute the first seizure determination control as shown in the flowchart of FIG. 13. As a result, the values of the low coast brake seizure flag LCBFIX1, the forward brake seizure flag FWBFIX1, and the reverse brake seizure flag RBFIX are set in step S302.

In step S303, the integrated controller 10 is configured to execute the second seizure determination control as shown in the flowchart of FIG. 14. As a result, the values of the low coast brake seizure flag LCBFIX2 and the reverse brake seizure flag RBFIX are set.

In step S304, the integrated controller 10 is configured to determine if the value of the low coast brake seizure flag LCBFIX1 is 1. If the value of the low coast brake seizure flag LCBFIX1 is 1 (Yes in step S304), then the control proceeds to step S305. On the other hand, if the value of the low coast brake seizure flag LCBFIX1 is not 1 (No in step S304), the control proceeds to step S307.

In step S305, the integrated controller 10 is configured to determine if the value of the low coast brake seizure flag LCBFIX2 is 1. If the value of the low coast brake seizure flag LCBFIX2 is 1 (Yes in step S305), then the control proceeds to step S306. If the value of the low coast brake seizure flag LCBFIX2 is not 1 (No in step S305), then the control proceeds to step S309.

In step S306, the integrated controller 10 determines that the forward brake B4 is not seized but the low coast brake B3 is seized because the values of the low coast brake seizure flag LCBFIX1 and the low coast brake seizure flag LCBFIX2 are both 1. Therefore, the integrated controller 10 is configured to set the value of the forward brake seizure flag FWBFIX1 to 0.

In step S307, the integrated controller 10 is configured to determine if the value of the low coast brake seizure flag LCBFIX2 is 1. If the value of the low coast brake seizure flag LCBFIX2 is 1 (Yes in step S307), then the control proceeds to step S308. If the value of the low coast brake seizure flag LCBFIX2 is not 1 (No in step S307), the control proceeds to step S309.

In step S308, even though the value of the low coast brake seizure flag LCBFIX1 is not 1, it can be determined that the low coast brake B3 is seized because the value of the low coast brake seizure flag LCBFIX2 is 1. Therefore, the integrated controller 10 is configured to set the value of the low coast brake seizure flag LCBFIX1 to 1.

In step S309, the integrated controller 10 determines that the forward brake B4 is seized if the forward brake seizure flag FWBFIX1 is set to 1. The integrated controller 10 determines that the low coast brake B3 is seized if the low coast brake seizure flag LCBFIX1 is set to 1. The integrated controller 10 determines that the reverse brake B1 is seized if the reverse brake seizure flag RBFIX1 is set to 1. Then, the integrated controller 10 is configured to control the drive force, selected gear, and engine start operation as appropriately to accommodate the seized engaging element of the automatic transmission AT.

Seizure Compensation Control

The compensation control executed by the integrated controller 10 in order to accommodate the seizure of the second clutch CL2 when it is determined that the seizure has occurred will now be explained. When decelerating in first or second gear, the integrated controller 10 is configured to weaken the engine braking by controlling the AT controller 7 to release the front brake B2 or the high and low reverse clutch C2 of the automatic transmission AT such that it cannot support a reaction force. Therefore, an excessive engine braking action can be prevented from occurring.

When the engine E is started while the hybrid vehicle is traveling and the second clutch CL2 is normal (not seized), the integrated controller 10 is configured to control the second clutch CL2 in the disengaged state or in the slipping state such that the torque transmission capacity thereof is lowered to a value just large enough to transmit the current drive torque and the drive force of the motor/generator MG is increased. After the rotational speed of the motor/generator MG has been increased, the first clutch CL1 is engaged in order to start the engine E. Conversely, when the second clutch CL2 is seized, the integrated controller 10 is configured to increase the drive force of the motor/generator MG after the engagement of the first clutch CL1 is started.

Thus, the additional load imposed due to the engagement of the first clutch CL1 is covered by the motor/generator MG and the change in the drive torque transmitted to the output shaft OUT is held to a minimum while the engine E is being started.

In a situation where the starting of the engine E is expected to be difficult, the first clutch CL1 is released when the vehicle is stopped and the engine E is cranked to the idle speed. In this way, engine starting is not necessary and the difficulty of restarting the engine E can be prevented.

In accordance with the hybrid vehicle control of the illustrated embodiment of the present invention, the following operational effects can be obtained.

The first seizure determination control is performed to determine if the second clutch CL2 is seized based on an actual gear ratio (first actual gear ratio) obtained when the second clutch CL2 is completely engaged and an actual gear ratio (second actual gear ratio) obtained when a disengagement command or a slip control command has been issued to the second clutch CL2 and the drive force (rotational speed) of the motor/generator MG has been increased. More specifically, it is determined that the second clutch CL2 is seized when both the first gear ratio and the second gear ratio are within a prescribed range of error with respect to a reference gear ratio GIA (a range defined by adding and subtracting a prescribed determination error K to and from the reference gear ratio GIA). Therefore, in addition to detecting if a failure has occurred inside the automatic transmission AT, it can be determined if a detected failure is a seizure failure. Additionally, since the rotational speed of the output shaft OUT does not change due to the inertia of the vehicle, the rigid lever of the common velocity diagram rotates about the output shaft OUT. Consequently, it is also possible to determine if a seizure has occurred by focusing solely on the rotational speed of the motor/generator MG because a change in the gear ratio is synonymous with a change in the rotational speed of the motor/generator MG.

The second seizure determination control is performed to determine if the second clutch CL2 is seized based on an actual gear ratio (first gear ratio) obtained when the second clutch CL2 is completely engaged and an actual gear ratio (second gear ratio) obtained when a disengagement command or a slip control command has been issued to the second clutch CL2 and the drive force (rotational speed) of the motor/generator MG has been decreased. More specifically, it is determined that the second clutch CL2 is seized when both the first gear ratio and the second gear ratio are within a prescribed range of error with respect to a reference gear ratio GIA (a range defined by adding and subtracting a prescribed determination error K to and from the reference gear ratio GIA). Therefore, in addition to detecting if a failure has occurred inside the automatic transmission AT, it can be determined if a detected failure is a seizure failure.

The second clutch CL2 is a brake element configured to transfer power by bearing a reaction force exerted by a rotary element coupled to the output shaft in response to an inputted drive force. When the second clutch CL2 corresponds to the forward brake B4 arranged with the forward one-way clutch F3 between the forward brake B4 and the middle sun gear S2 and the low coast brake B3 arranged in parallel with the forward brake B4, seizure of the second clutch CL2 is determined with the first seizure determination control and the second seizure determination control. The first seizure determination control is executed when only the forward brake B4 is engaged to determine if the forward brake B4 is seized. On the other hand, the second seizure determination control is executed when the low coast brake B3 is engaged to determine if the low coast brake B3 is seized. Thus, even if the second clutch CL2 corresponds to a combination of a plurality of engaging elements of the automatic transmission AT, the seized engaging element can be identified. Furthermore, the second clutch CL2 can be checked for seizure both when the vehicle is in a drive state and when the vehicle is in a coasting state, i.e., seizure determinations can be executed in a variety of traveling situations.

When the hybrid vehicle is traveling in the EV mode (in which the engine E is stopped, the first clutch CL1 is released, and only the motor/generator MG is driving the vehicle) and the engine E is started by increasing the drive force (rotational speed) of the motor/generator MG and engaging the first clutch CL1, if it has been determined that the second clutch CL2 is seized, then the increase of the drive force of the motor/generator MG is suppressed until the engagement of the first clutch CL1 has been started. Thus, the additional load imposed due to the engagement of the first clutch CL1 is covered by the motor/generator MG and the change in the drive torque transmitted to the output shaft OUT is held to a minimum while the engine E is being started.

If it has been determined that the second clutch CL2 is seized, then the first clutch CL1 is released when the vehicle is traveling at or below a prescribed speed while remaining in the HEV mode (in which the first clutch CL1 is normally engaged). As a result, the engine E can be operated at the idle speed and it is not necessary to restart the engine, thus preventing the driving performance from being degraded due to restarting of the engine.

In the illustrated embodiment of the present invention, although only the first and second seizure determination controls for determining whether the second clutch CL2 is seized when the automatic transmission AT is in one of first gear, second gear and reverse gear as shown in FIGS. 13 and 14, similar controls can be performed to determine whether the second clutch CL2 is seized when the automatic transmission AT is in one of third gear, fourth gear and fifth gear. As mentioned above, the high and low reverse clutch C2 of the automatic transmission AT serves as the second clutch CL2 when the automatic transmission AT is in third, fourth, or fifth gear.

Although the hybrid vehicle control apparatus in accordance with present invention is explained herein based on the illustrated embodiment, the specific constituent features of the hybrid vehicle control apparatus are not limited to those of the illustrated embodiment. Various design modifications and supplemental features are allowed so long as the scope of the invention as laid out in the claims is not departed from. For example, when the second clutch includes a brake element with a one-way clutch and another brake element arranged in parallel therewith, the seized engaging element can be identified by using a combination of the first seizure determination control and the second seizure determination control. Additionally, although in the illustrated embodiment the seizure determination controls are accomplished by comparing the first actual gear ratio and the second actual gear ratio to the reference gear ratio GIA, it is also acceptable to compare the first actual gear ratio and the second actual gear ratio to each other and to determine that a seizure exists if the difference between the first and second gear ratios is smaller than a prescribed value.

Accordingly, the hybrid vehicle control apparatus in accordance with the present invention is configured to determine if the second clutch CL2 is seized and thereby improve the driving performance of the hybrid vehicle.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiment according to the present invention are provided for illustration only, and not for the purpose of limiting the invention as defined by the appended claims and their equivalents.

What is claimed is:

1. A hybrid vehicle control apparatus comprising:
   an engine;
   a motor;
   a first engaging element arranged between the engine and the motor to selectively connect and disconnect the engine and the motor;
   a second engaging element arranged between the motor and a drive wheel of a vehicle to selectively connect and disconnect the motor and the drive wheel;
   an input rotational speed detecting section configured and arranged to detect an input rotational speed of the second engaging element corresponding to a rotational speed of the motor; and a controller that determines whether the second engaging element is seized based on the input rotational speed detected by the rotational speed detecting section in response to one of a disengagement command and a slip engagement command being issued to the second engaging element and a drive force of at least one of the engine and the motor being changed.

2. The hybrid vehicle control apparatus of claim 1, wherein the controller is further configured to determine whether the second engaging element is seized when the one of the disengagement command and the slip engagement command is issued to the second engaging element and the drive force of the at least one of the engine and the motor is increased while the vehicle is in a drive state.

3. The hybrid vehicle control apparatus of claim 1, wherein the controller is further configured to determine whether the second engaging element is seized when the one of the disengagement command and the slip engagement command is issued to the second engaging element and the drive force of the at least one of the engine and the motor is decreased while the vehicle is in a coasting state.

4. The hybrid vehicle control apparatus of claim 1, wherein the controller is further configured to start the engine by increasing the drive force of the motor and engaging the first engaging element when the vehicle is in a motor drive mode in which the engine is stopped, the first engaging element is disengaged, and the vehicle is traveling solely by the drive force of the motor, and to suppress an increase in the drive force of the motor until engagement of the first engaging element is started when the controller determines that the second engaging element is seized.

5. The hybrid vehicle control apparatus of claim 1, wherein the controller is further configured to disengage the first engaging element when the controller determines that the second engaging element is seized and when the vehicle is traveling at or below a prescribed speed in a hybrid drive mode in which the engine is driven and the first engaging element is engaged.

6. A hybrid vehicle control apparatus comprising:
an engine;
a motor;
a first engaging element arranged between the engine and the motor to selectively connect and disconnect the engine and the motor;
a second engaging element arranged between the motor and a drive wheel of a vehicle to selectively connect and disconnect the motor and the drive wheel;
an input rotational speed detecting section configured and arranged to detect an input rotational speed of the second engaging element corresponding to a rotational speed of the motor;
a controller configured to determine whether the second engaging element is seized based on the input rotational speed detected by the rotational speed detecting section when one of a disengagement command and a slip engagement command has been issued to the second engaging element and a drive force of at least one of the engine and the motor has been changed;
an output rotational speed detecting section configured and arranged to detect an output rotational speed of the second engaging element corresponding to a rotational speed of the drive wheel; and
an automatic transmission having a plurality of planetary gears and a plurality of engaging elements including the second engaging element as at least one of the engaging elements, the automatic transmission being configured and arranged to achieve one of a plurality of gear ratios by selectively engaging and disengaging the engaging elements, the controller being further configured to
determine a reference gear ratio that the automatic transmission achieves when the second engaging element is completely engaged,
calculate an actual gear ratio based on a ratio of the input rotational speed and the output rotational speed, and
determine that the second engaging element is seized if the actual gear ratio is within a prescribed range of error with respect to the reference gear ratio when the one of the disengagement command and the slip engagement command is issued to the second engaging element and the drive force of at least one of the engine and the motor is changed.

7. The hybrid vehicle control apparatus of claim 6, wherein the controller is further configured to perform a determination control for determining whether the second engaging element is seized when the actual gear ratio calculated when the second engaging element is completely engaged is within the prescribed range of error with respect to the reference gear ratio.

8. A hybrid vehicle control apparatus comprising:
an engine;
a motor;
a first engaging element arranged between the engine and the motor to selectively connect and disconnect the engine and the motor;
a second engaging element arranged between the motor and a drive wheel of a vehicle to selectively connect and disconnect the motor and the drive wheel;
an input rotational speed detecting section configured and arranged to detect an input rotational speed of the second engaging element corresponding to a rotational speed of the motor;
a controller configured to determine whether the second engaging element is seized based on the input rotational speed detected by the rotational speed detecting section when one of a disengagement command and a slip engagement command has been issued to the second engaging element and a drive force of at least one of the engine and the motor has been changed; and
an automatic transmission having a plurality of planetary gears and a plurality of engaging elements including the second engaging element as at least one of the engaging elements, the automatic transmission being configured and arranged to achieve one of a plurality of gear ratios by selectively engaging and disengaging the engaging elements, the second engaging element including a first brake element and a second brake element configured and arranged to transfer power in response to an inputted drive force by bearing a reaction force exerted by a rotary element coupled to an output shaft of the automatic transmission, the first brake element being coupled to the rotary element with a one-way clutch disposed therebetween and the second brake element being arranged in parallel with the first brake element, the controller being further configured to
determine whether the first brake element of the second engaging element is seized when the one of the disengagement command and the slip engagement command is issued to the second engaging element and the drive force of the at least one of the engine and the motor is increased while the vehicle is in a drive state in which the first brake element is engaged and the second brake element is not engaged, and determine whether the second brake element of the second engaging element is seized when the one of the disengagement command and the slip engagement command is issued to the second engaging element and the drive force of the at least one of the engine and the motor is decreased while the vehicle is in a coasting state in which the second brake is engaged.

9. The hybrid vehicle control apparatus of claim 8, wherein the controller is further configured to determine a reference gear ratio that the automatic transmission achieves when the second engaging element is completely engaged, and to determine that the second engaging element is seized when a first actual gear ratio calculated when the second engaging element is completely engaged and a second actual gear ratio calculated when the one of the disengagement command and the slip engagement command is issued to the second engaging element are within a prescribed range of error with respect to the reference gear ratio.

10. A hybrid vehicle control method comprising: controlling a first engaging element disposed between an engine and a motor to selectively control a engagement state between the engine and the motor;

controlling a second engaging element disposed between the motor and a drive wheel of a vehicle to selectively control a engagement state between the motor and the drive wheel;

detecting an input rotational speed of the second engaging element corresponding to a rotational speed of the motor; and determining whether the second engaging element is seized based on the input rotational speed detected in response to one of a disengagement command and a slip engagement command being issued to the second engaging element and a drive force of at least one of the engine and the motor being changed.

* * * * *